United States Patent
Ke et al.

(10) Patent No.: US 11,092,785 B2
(45) Date of Patent: Aug. 17, 2021

(54) OPTICAL IMAGING LENS ASSEMBLY COMPRISING FIVE LENSES OF +--+-, +-0+-, +-++-, +-+--, OR +---- REFRACTIVE POWERS, IMAGE CAPTURING UNIT AND ELECTRONIC DEVICE

(71) Applicant: LARGAN PRECISION CO.,LTD., Taichung (TW)

(72) Inventors: Yu-Chun Ke, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 186 days.

(21) Appl. No.: 16/503,812

(22) Filed: Jul. 5, 2019

(65) Prior Publication Data
US 2020/0363612 A1 Nov. 19, 2020

(30) Foreign Application Priority Data
May 17, 2019 (TW) ................. 108117180

(51) Int. Cl.
G02B 13/00 (2006.01)
G02B 9/60 (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS 7,502,181 B2   3/2009   Shinohara
8,000,031 B1   8/2011   Tsai
(Continued)

FOREIGN PATENT DOCUMENTS

CN   105824106 A   8/2016
CN   107664811 A   2/2018
(Continued)

OTHER PUBLICATIONS

IN Office Action in Application No. 201934031655 dated Mar. 4, 2021.
(Continued)

*Primary Examiner* — Wen Huang
(74) *Attorney, Agent, or Firm* — Maschoff Brennan

(57) ABSTRACT

An optical imaging lens assembly includes five lens elements which are, in order from an object side to an image side: a first lens element, a second lens element, a third lens element, a fourth lens element and a fifth lens element. Each of the five lens elements has an object-side surface facing toward the object side and an image-side surface facing toward the image side. The first lens element has positive refractive power. The object-side surface of the first lens element is convex in a paraxial region thereof. The second lens element has negative refractive power. The object-side surface of the fourth lens element is convex in a paraxial region thereof. The fifth lens element has negative refractive power. The image-side surface of the fifth lens element is concave in a paraxial region thereof and has at least one convex critical point in an off-axis region thereof.

20 Claims, 25 Drawing Sheets

(56) References Cited

U.S. PATENT DOCUMENTS

| | | |
|---|---|---|
| 8,395,852 B2 | 3/2013 | Tsai et al. |
| 8,488,255 B2 | 7/2013 | Tsai |
| 8,576,498 B2 | 11/2013 | Huang |
| 8,743,478 B2 | 6/2014 | Tsai et al. |
| 8,804,253 B2 | 8/2014 | Tsai et al. |
| 9,001,435 B2 | 4/2015 | Tsai et al. |
| 9,207,435 B2 | 12/2015 | Tsai et al. |
| 9,638,894 B2 | 5/2017 | Hsieh et al. |
| 9,874,720 B2 | 1/2018 | Hsueh et al. |
| 9,989,741 B1 | 6/2018 | Hsueh et al. |
| 2010/0046096 A1 | 2/2010 | Hirao et al. |
| 2010/0166413 A1 | 7/2010 | Hirao et al. |
| 2010/0321794 A1 | 12/2010 | Hirao et al. |
| 2011/0001865 A1 | 1/2011 | Hiroo et al. |
| 2011/0267709 A1 | 11/2011 | Hirao et al. |
| 2014/0293447 A1 | 10/2014 | Noda et al. |
| 2014/0293449 A1 | 10/2014 | Noda et al. |
| 2014/0293452 A1 | 10/2014 | Kanda et al. |
| 2014/0293459 A1 | 10/2014 | Noda et al. |
| 2014/0340765 A1* | 11/2014 | Tsai ............... G02B 9/60 359/714 |
| 2015/0077864 A1 | 3/2015 | Noda et al. |
| 2015/0241661 A1 | 8/2015 | Shih et al. |
| 2015/0338608 A1 | 11/2015 | Takei |
| 2016/0161720 A1 | 6/2016 | Son |
| 2017/0269329 A1 | 9/2017 | Jhang et al. |
| 2017/0276913 A1 | 9/2017 | Yao et al. |
| 2018/0292628 A1 | 10/2018 | Huang et al. |
| 2019/0377160 A1 | 12/2019 | Sikine et al. |
| 2020/0241240 A1 | 7/2020 | Chen et al. |

FOREIGN PATENT DOCUMENTS

| | | |
|---|---|---|
| CN | 108398769 A | 8/2018 |
| CN | 109445072 A | 3/2019 |
| JP | 2014-123034 A | 7/2014 |
| TW | 201539024 A | 10/2015 |
| TW | 201539027 A | 10/2015 |
| TW | 201819984 A | 6/2018 |
| TW | I683149 B | 1/2020 |

OTHER PUBLICATIONS

TW Office Action in Application No. 108117180 dated Mar. 3, 2020.

* cited by examiner

US 11,092,785 B2

OPTICAL IMAGING LENS ASSEMBLY COMPRISING FIVE LENSES OF +−−+−, +−0+−, +−++−, +−+−−, OR +−−−− REFRACTIVE POWERS, IMAGE CAPTURING UNIT AND ELECTRONIC DEVICE

RELATED APPLICATIONS

This application claims priority to Taiwan Application 108117180, filed on May 17, 2019, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical imaging lens assembly includes five lens elements. The five lens elements are, in order from an object side to an image side, a first lens element, a second lens element, a third lens element, a fourth lens element and a fifth lens element. Each of the five lens elements has an object-side surface facing toward the object side and an image-side surface facing toward the image side.

The first lens element has positive refractive power, and the object-side surface of the first lens element is convex in a paraxial region thereof. The second lens element has negative refractive power. The object-side surface of the fourth lens element is convex in a paraxial region thereof. The fifth lens element has negative refractive power, and the image-side surface of the fifth lens element is concave in a paraxial region thereof and has at least one convex critical point in an off-axis region thereof.

When an Abbe number of the second lens element is V2, an Abbe number of the third lens element is V3, an Abbe number of the fourth lens element is V4, a central thickness of the fourth lens element is CT4, a central thickness of the fifth lens element is CT5, a curvature radius of the object-side surface of the fourth lens element is R7, a focal length of the optical imaging lens assembly is f, a focal length of the first lens element is f1, and a focal length of the second lens element is f2, the following conditions are satisfied:

$$30.0 < V2+V3+V4 < 95.0;$$

$$1.35 < CT5/CT4;$$

$$0.40 < R7/f < 2.80; \text{ and}$$

$$2.50 < |f2/f1|.$$

According to another aspect of the present disclosure, an optical imaging lens assembly includes five lens elements. The five lens elements are, in order from an object side to an image side, a first lens element, a second lens element, a third lens element, a fourth lens element and a fifth lens element. Each of the five lens elements has an object-side surface facing toward the object side and an image-side surface facing toward the image side.

The first lens element has positive refractive power, and the object-side surface of the first lens element is convex in a paraxial region thereof. The second lens element has negative refractive power, and the image-side surface of the second lens element is concave in a paraxial region thereof. The object-side surface of the fourth lens element is convex in a paraxial region thereof. The fifth lens element has negative refractive power, and the image-side surface of the fifth lens element is concave in a paraxial region thereof and has at least one convex critical point in an off-axis region thereof.

When an Abbe number of the second lens element is V2, an Abbe number of the third lens element is V3, an Abbe number of the fourth lens element is V4, a central thickness of the fourth lens element is CT4, a central thickness of the fifth lens element is CT5, a curvature radius of the object-side surface of the fourth lens element is R7, a focal length of the optical imaging lens assembly is f, a focal length of the first lens element is f1, and a focal length of the second lens element is f2, the following conditions are satisfied:

$$30.0 < V2+V3+V4 < 95.0;$$

$$1.35 < CT5/CT4;$$

$$0 < R7/f < 2.80; \text{ and}$$

$$2.50 < |f2/f1|.$$

According to another aspect of the present disclosure, an optical imaging lens assembly includes five lens elements. The five lens elements are, in order from an object side to an image side, a first lens element, a second lens element, a third lens element, a fourth lens element and a fifth lens element. Each of the five lens elements has an object-side surface facing toward the object side and an image-side surface facing toward the image side.

The first lens element has positive refractive power, and the object-side surface of the first lens element is convex in a paraxial region thereof. The second lens element has negative refractive power. The object-side surface of the fourth lens element is convex in a paraxial region thereof. The fifth lens element has negative refractive power, the object-side surface of the fifth lens element is convex in a paraxial region thereof, and the image-side surface of the fifth lens element is concave in a paraxial region thereof and has at least one convex critical point in an off-axis region thereof.

When an Abbe number of the second lens element is V2, an Abbe number of the third lens element is V3, an Abbe number of the fourth lens element is V4, a central thickness of the fourth lens element is CT4, a central thickness of the fifth lens element is CT5, a curvature radius of the object-side surface of the fourth lens element is R7, a focal length of the optical imaging lens assembly is f, a focal length of the second lens element is f2, and a focal length of the fifth lens element is f5, the following conditions are satisfied:

$$30.0 < V2+V3+V4 < 95.0;$$

$$1.35 < CT5/CT4;$$

$$0 < R7/f < 8.50; \text{ and}$$

$$1.0 < |f2/f5|.$$

According to another aspect of the present disclosure, an image capturing unit includes one of the aforementioned optical imaging lens assemblies and an image sensor, wherein the image sensor is disposed on an image surface of the optical imaging lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An optical imaging lens assembly includes five lens elements. The five lens elements are, in order from an object side to an image side, a first lens element, a second lens element, a third lens element, a fourth lens element and a fifth lens element. Each of the five lens elements of the optical imaging lens assembly has an object-side surface facing toward the object side and an image-side surface facing toward the image side.

The first lens element has positive refractive power. Therefore, it is favorable for providing the positive refractive power required for achieving compactness. The object-side surface of the first lens element is convex in a paraxial region thereof. Therefore, it is favorable for uniformly gathering light from each field of view into the optical imaging lens assembly. The image-side surface of the first lens element can be concave in a paraxial region thereof. Therefore, it is favorable for correcting astigmatism.

The second lens element has negative refractive power. Therefore, it is favorable for balancing aberrations such as spherical aberration caused by the miniaturization of the optical imaging lens assembly. The image-side surface of the second lens element can be concave in a paraxial region thereof. Therefore, it is favorable for adjusting the refractive power of the second lens element so as to correct aberrations.

The object-side surface of the fourth lens element is convex in a paraxial region thereof. Therefore, it is favorable for providing proper refractive power of the fourth lens element so as to adjust the size of the optical imaging lens assembly. The fourth lens element can have positive refractive power. Therefore, it is favorable for dispersing the positive refractive power required for achieving compactness so as to reduce sensitivity. The image-side surface of the fourth lens element can be concave in a paraxial region thereof. Therefore, it is favorable for adjusting the shape of the fourth lens element so as to adjust the travelling direction of light.

The fifth lens element has negative refractive power. Therefore, it is favorable for obtaining a configuration of the optical imaging lens assembly having a proper back focal length. The image-side surface of the fifth lens element is concave in a paraxial region thereof. Therefore, it is favorable for providing proper refractive power of the fifth lens element so as to adjust the back focal length of the optical imaging lens assembly. The object-side surface of the fifth lens element can be convex in a paraxial region thereof. Therefore, it is favorable for adjusting the shape of the fifth lens element so as to correct off-axis aberrations.

Figure 25:
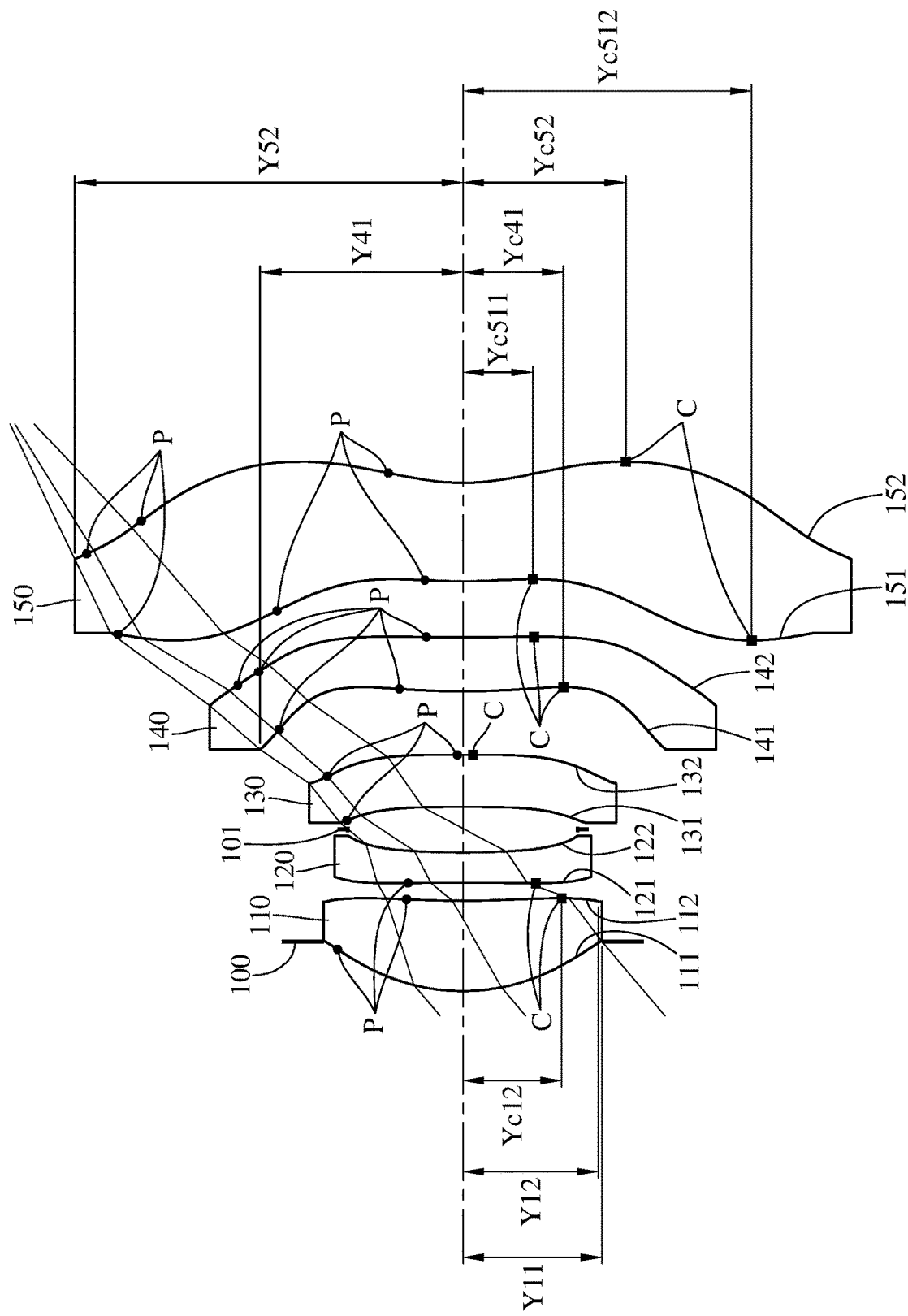
FIG. 25 shows a schematic view of Y11, Y12, Y41, Y52, Yc12, Yc41, Yc511, Yc512, Yc52 and inflection points and critical points of the five lens elements according to the 1st embodiment of the present disclosure.

According to the present disclosure, at least one lens element of the optical imaging lens assembly can have at least one lens surface having at least one critical point in an off-axis region thereof. Therefore, it is favorable for increasing the shape variation of the lens elements so as to miniaturize the optical imaging lens assembly and improve image quality on the peripheral region of an image surface of the optical imaging lens assembly. Moreover, each of at least two lens elements of the optical imaging lens assembly can have at least one lens surface having at least one critical point in an off-axis region thereof. Moreover, each of at least three lens elements of the optical imaging lens assembly can have at least one lens surface having at least one critical point in an off-axis region thereof. Please refer to FIG. 25, which shows a schematic view of critical points C of the five lens elements according to the 1st embodiment of the present disclosure.

The image-side surface of the first lens element can have at least one critical point in an off-axis region thereof. Therefore, it is favorable for adjusting the travelling direction of light so as to have a proper size distribution of the optical imaging lens assembly. When a vertical distance between the critical point on the image-side surface of the first lens element and an optical axis is Yc12, and a maximum effective radius of the image-side surface of the first lens element is Y12, the following condition can be satisfied: 0.60<Yc12/Y12<1.0. Therefore, it is favorable for further adjusting the travelling direction of light so as to reduce the outer diameter of the first lens element. Please refer to FIG. 25, which shows a schematic view of Y12, Yc12 and the critical point C of the first lens element 110 according to the 1st embodiment of the present disclosure.

The object-side surface of the fourth lens element can have at least one critical point in an off-axis region thereof. Therefore, it is favorable for adjusting the incident direction of light on the surface of the fourth lens element so as to correct off-axis aberrations and reduce surface reflection. When a vertical distance between the critical point on the object-side surface of the fourth lens element and the optical axis is Yc41, and a maximum effective radius of the object-side surface of the fourth lens element is Y41, the following condition can be satisfied: 0.35<Yc41/Y41<0.70. Therefore, it is favorable for further adjusting the shape of the fourth lens element so as to correct off-axis aberrations. Please refer to FIG. 25, which shows a schematic view of Y41, Yc41 and the critical points C of the fourth lens element 140 according to the 1st embodiment of the present disclosure.

The object-side surface of the fifth lens element can have at least one concave critical point and at least one convex critical point in an off-axis region thereof. Therefore, it is favorable for adjusting the shape of the fifth lens element so as to correct off-axis aberrations. When a vertical distance between the concave critical point on the object-side surface of the fifth lens element and the optical axis is Yc511, and a vertical distance between the convex critical point on the object-side surface of the fifth lens element and the optical axis is Yc512, the following condition can be satisfied: 2.5<Yc512/Yc511<4.8. Therefore, it is favorable for further adjusting the shape of the fifth lens element so as to correct off-axis aberrations such as off-axis field curvature. Moreover, the image-side surface of the fifth lens element has at least one convex critical point in an off-axis region thereof. Therefore, it is favorable for increasing illuminance on the peripheral region of the image surface and correct aberrations of the peripheral image. When a vertical distance between the convex critical point on the image-side surface of the fifth lens element and the optical axis is Yc52, and a maximum effective radius of the image-side surface of the fifth lens element is Y52, the following condition can be satisfied: 0.20<Yc52/Y52<0.60. Therefore, it is favorable for further improving image quality on the peripheral region, and it is also favorable for adjusting the incident angle of light on the image surface of the optical imaging lens assembly so as to improve response efficiency of the image sensor. Please refer to FIG. 25, which shows a schematic view of Y52, Yc511, Yc512, Yc52 and the critical points C of the fifth lens element 150 according to the 1st embodiment of the present disclosure.

According to the present disclosure, each of at least three lens elements of the optical imaging lens assembly can have at least one lens surface having at least one inflection point. Therefore, it is favorable for increasing the shape variation of the lens elements so as to miniaturize the optical imaging lens assembly and improve image quality. Please refer to FIG. 25, which shows a schematic view of inflection points P of the five lens elements according to the 1st embodiment of the present disclosure.

When an Abbe number of the second lens element is V2, an Abbe number of the third lens element is V3, and an Abbe number of the fourth lens element is V4, the following condition is satisfied: 30.0<V2+V3+V4<95.0. Therefore, a proper selection of materials of the lens elements collaborating with each other is favorable for correcting chromatic aberration and reducing colour cast.

When a central thickness of the fourth lens element is CT4, and a central thickness of the fifth lens element is CT5, the following condition is satisfied: 1.35<CT5/CT4. Therefore, it is favorable for the fourth and fifth lens elements to collaborate with each other so as to miniaturize the optical imaging lens assembly. Moreover, the following condition can also be satisfied: 1.50<CT5/CT4<3.80.

When a curvature radius of the object-side surface of the fourth lens element is R7, and a focal length of the optical imaging lens assembly is f, the following condition is satisfied: 0<R7/f<8.50. Therefore, it is favorable for adjusting the shape of the fourth lens element so as to have proper refractive power of the fourth lens element. Moreover, the following condition can also be satisfied: 0<R7/f<5.00. Moreover, the following condition can also be satisfied: 0<R7/f<2.80. Moreover, the following condition can also be satisfied: 0.40<R7/f<2.80. Moreover, the following condition can also be satisfied: 0.80<R7/f<2.50.

When a focal length of the first lens element is f1, and a focal length of the second lens element is f2, the following condition can be satisfied: 2.50<|f2/f1|. Therefore, it is favorable for the refractive power of the first and second lens elements to collaborate with each other so as to reduce aberrations caused by reducing the total track length of the optical imaging lens assembly. Moreover, the following condition can also be satisfied: 2.60<|f2/f1|<5.00.

When the focal length of the second lens element is f2, and a focal length of the fifth lens element is f5, the following condition can be satisfied: 1.0<|f2/f5|. Therefore, it is favorable for adjusting the refractive power distribution of the optical imaging lens assembly so as to reduce sensitivity. Moreover, the following condition can also be satisfied: 1.3<|f2/f5|<2.0.

When a focal length of the fourth lens element is f4, and the focal length of the fifth lens element is f5, the following condition can be satisfied: 2.0<|f4/f5|<7.0. Therefore, it is favorable for the fourth lens element to collaborate with the fifth lens element for correcting aberrations.

When a minimum value among Abbe numbers of all lens elements of the optical imaging lens assembly is Vmin, the following condition can be satisfied: 10.0<Vmin<20.0. Therefore, a proper selection of materials of the lens elements is favorable for correcting aberrations such as chromatic aberration.

When a maximum value among refractive indices of all lens elements of the optical imaging lens assembly is Nmax, the following condition can be satisfied: 1.66<Nmax<1.75. Therefore, a proper selection of materials of the lens elements featuring high refractive index is favorable for further correcting aberrations and miniaturizing the optical imaging lens assembly.

When the central thickness of the fourth lens element is CT4, and an axial distance between the fourth lens element and the fifth lens element is T45, the following condition can be satisfied: 0.80<CT4/T45<1.5. Therefore, it is favorable for the fourth lens element to collaborate with the fifth lens element for reducing the image side size of the optical imaging lens assembly.

When an axial distance between the object-side surface of the first lens element and the image surface is TL, the following condition can be satisfied: 3.0 [mm]<TL<6.0 [mm]. Therefore, it is favorable for the optical imaging lens assembly to have a proper total track length for various applications.

When the axial distance between the object-side surface of the first lens element and the image surface is TL, and the focal length of the optical imaging lens assembly is f, the following condition can be satisfied: 0.90<TL/f<1.40. Therefore, it is favorable for obtaining a balance between the size and field of view of the optical imaging lens assembly.

When the axial distance between the object-side surface of the first lens element and the image surface is TL, and a maximum image height of the optical imaging lens assembly (half of a diagonal length of an effective photosensitive area of an image sensor) is ImgH, the following condition can be satisfied: 0.90<TL/ImgH<1.60. Therefore, it is favorable for obtaining a balance between the reduction of the total track length and the enlargement of the image surface.

When a curvature radius of the object-side surface of the first lens element is R1, and a curvature radius of the image-side surface of the first lens element is R2, the following condition can be satisfied: −2.0<(R1+R2)/(R1−R2)<−1.4. Therefore, it is favorable for adjusting the shape of the first lens element so as to correct aberrations such as astigmatism.

When the Abbe number of the second lens element is V2, the Abbe number of the third lens element is V3, and the Abbe number of the fourth lens element is V4, at least one of the following conditions can be satisfied: 10.0<V2<20.0; 15.0<V3<38.0; and 15.0<V4<38.0. Therefore, a proper selection of materials of the lens elements is favorable for correcting aberrations such as chromatic aberration.

When the Abbe number of the second lens element is V2, and a refractive index of the second lens element is N2, the following condition can be satisfied: 7.0<V2/N2<12.0. Therefore, a proper selection of material of the second lens element is favorable for further correcting aberrations.

When a central thickness of the first lens element is CT1, and an axial distance between the first lens element and the second lens element is T12, the following condition can be satisfied: 3.8<CT1/T12<8.0. Therefore, it is favorable for the first lens element to collaborate with the second lens element for reducing the object side size of the optical imaging lens assembly. Moreover, the following condition can also be satisfied: 6.3<CT1/T12<8.0.

When a curvature radius of the image-side surface of the second lens element is R4, and the focal length of the optical imaging lens assembly is f, the following condition can be satisfied: 1.0<R4/f<2.3. Therefore, it is favorable for adjusting the refractive power of the second lens element so as to correct aberrations. Moreover, the following condition can also be satisfied: 1.2<R4/f<2.1.

When the focal length of the optical imaging lens assembly is f, a curvature radius of the object-side surface of the third lens element is R5, and a curvature radius of the image-side surface of the third lens element is R6, the following condition can be satisfied: f/|R5|+f/|R6|<1.5. Therefore, it is favorable for adjusting the shape and refractive power of the third lens element so as to balance the refractive power distribution of the object side and the image side of the optical imaging lens assembly. Moreover, the following condition can also be satisfied: f/|R5|+f/|R6|<0.80.

When the focal length of the optical imaging lens assembly is f, a focal length of the third lens element is f3, the focal length of the fourth lens element is f4, and the focal length of the fifth lens element is f5, the following condition can be satisfied: −0.50<f/f3+f/f4+f/f5<0. Therefore, it is favorable for adjusting the refractive power distribution of the optical imaging lens assembly so as to adjust the size of the optical imaging lens assembly and correct aberrations.

When the focal length of the optical imaging lens assembly is f, and the focal length of the fifth lens element is f5, the following condition can be satisfied: −2.0<f5/f<−1.0. Therefore, it is favorable for adjusting the refractive power of the fifth lens element so as to adjust the back focal length of the optical imaging lens assembly.

When an f-number of the optical imaging lens assembly is Fno, the following condition can be satisfied: 1.40<Fno<2.60. Therefore, it is favorable for the optical imaging lens assembly to have a proper aperture size for various applications.

When half of a maximum field of view of the optical imaging lens assembly is HFOV, the following condition can be satisfied: 35.0 [deg.]<HFOV<50.0 [deg.]. Therefore, it is favorable for providing a wide field of view configuration and preventing excessive distortion caused by overly wide field of view.

When a central thickness of the third lens element is CT3, and an axial distance between the third lens element and the fourth lens element is T34, the following condition can be satisfied: 0.55<CT3/T34<1.0. Therefore, it is favorable for the third lens element to collaborate with the fourth lens element for a proper size distribution of the optical imaging lens assembly.

When the Abbe number of the second lens element is V2, the Abbe number of the third lens element is V3, the Abbe number of the fourth lens element is V4, the refractive index of the second lens element is N2, a refractive index of the third lens element is N3, and a refractive index of the fourth lens element is N4, the following condition can be satisfied: 20.0<V2/N2+V3/N3+V4/N4<60.0. Therefore, a proper selection of materials of the lens elements is favorable for correcting aberrations and miniaturizing the optical imaging lens assembly.

When a sum of central thicknesses of all lens elements of the optical imaging lens assembly is ΣCT, and a sum of axial distances between each of all adjacent lens elements of the optical imaging lens assembly is $\Sigma AT$, the following condition can be satisfied: $1.6<\Sigma CT/\Sigma AT<2.0$. Therefore, it is favorable for adjusting the distribution of lens elements so as to miniaturize the optical imaging lens assembly.

When the focal length of the optical imaging lens assembly is f, the focal length of the third lens element is f3, and the focal length of the fourth lens element is f4, the following condition can be satisfied: $|f/f3|+|f/f4|<0.80$. Therefore, it is favorable for the third lens element to collaborate with the fourth lens element for correcting off-axis aberrations. Moreover, the following condition can also be satisfied: $|f/f3|+|f/f4|<0.50$.

When the focal length of the optical imaging lens assembly is f, and a curvature radius of the object-side surface of the fifth lens element is R9, the following condition can be satisfied: $1.0<f/R9<2.0$. Therefore, it is favorable for the fifth lens element to have a proper shape and refractive power so as to correct aberrations.

When a curvature radius of the image-side surface of the fifth lens element is R10, and the maximum image height of the optical imaging lens assembly is ImgH, the following condition can be satisfied: $R10/ImgH<0.48$. Therefore, it is favorable for adjusting the incident angle of light on the image surface of the optical imaging lens assembly so as to improve response efficiency of the image sensor.

According to the present disclosure, the aforementioned features and conditions can be utilized in numerous combinations so as to achieve corresponding effects.

According to the present disclosure, the lens elements of the optical imaging lens assembly can be made of either glass or plastic material. When the lens elements are made of glass material, the refractive power distribution of the optical imaging lens assembly may be more flexible. The glass lens element can either be made by grinding or molding. When the lens elements are made of plastic material, the manufacturing costs can be effectively reduced. Furthermore, surfaces of each lens element can be arranged to be aspheric, which allows more control variables for eliminating aberrations thereof, the required number of the lens elements can be reduced, and the total track length of the optical imaging lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical imaging lens assembly, based on the corresponding image sensor, can be flat or curved, especially a curved surface being concave facing towards the object side of the optical imaging lens assembly.

According to the present disclosure, an image correction unit, such as a field flattener, can be optionally disposed between the lens element closest to the image side of the optical imaging lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the optical imaging lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens assembly and thereby provides a wider field of view for the same.

According to the present disclosure, the optical imaging lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
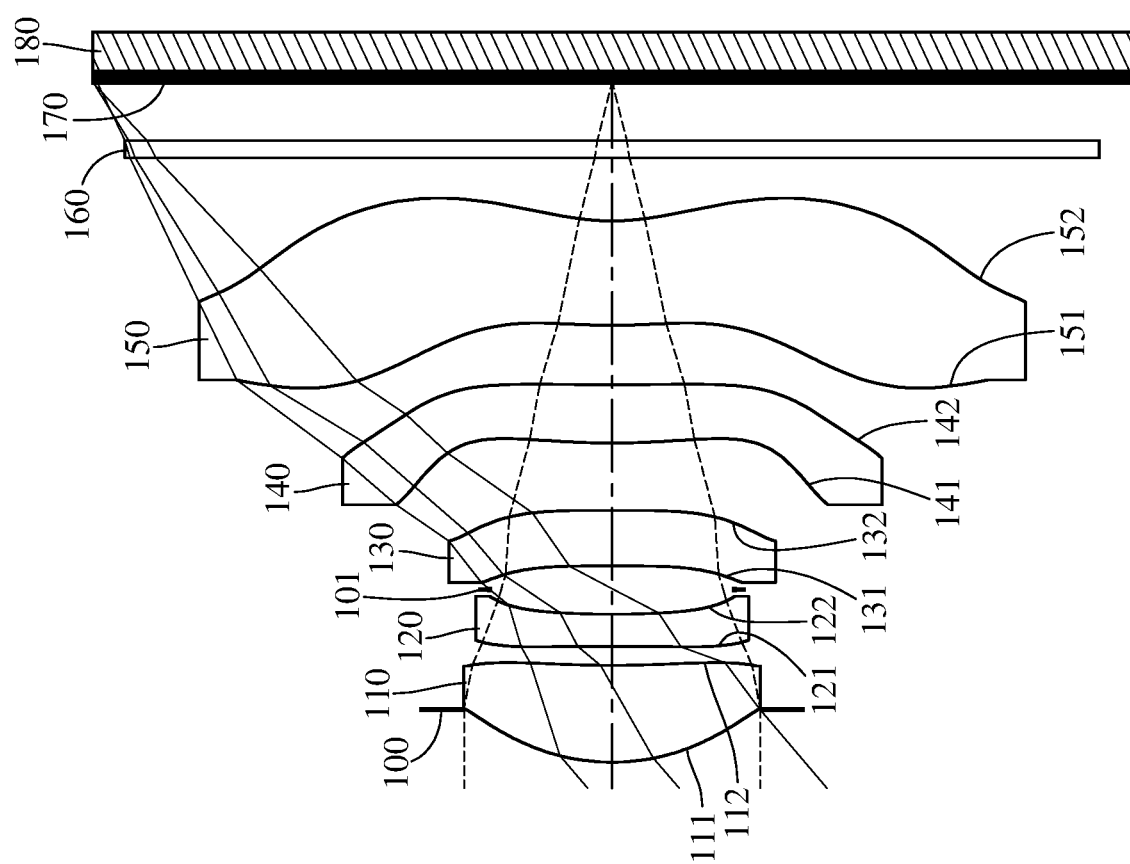
FIG. 1 is a schematic view of an image capturing unit according to the 1st embodiment of the present disclosure.
Figure 2:
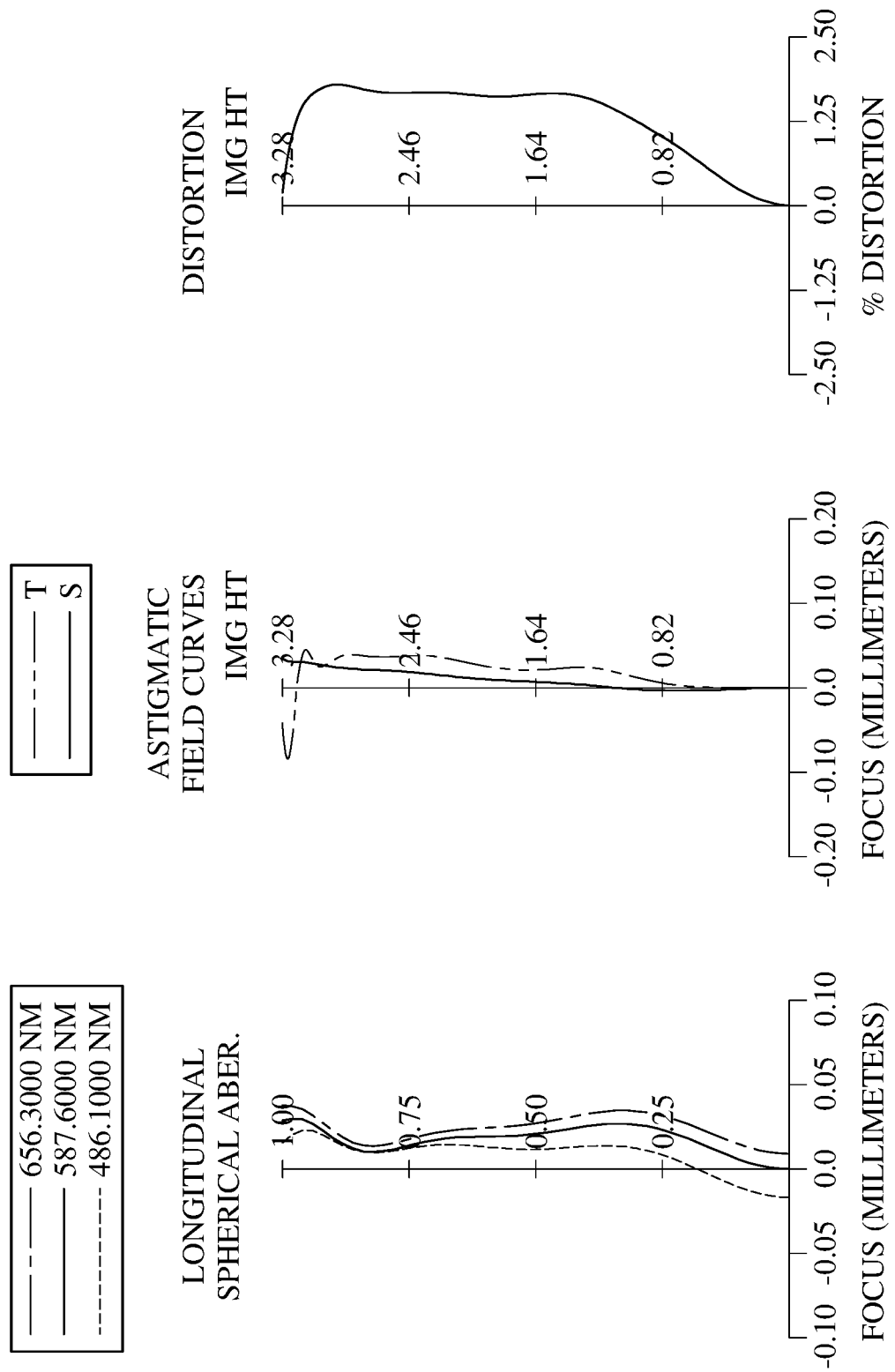
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens assembly (its reference numeral is omitted) of the present disclosure and an image sensor 180. The optical imaging lens assembly includes, in order from an object side to an image side, an aperture stop 100, a first lens element 110, a second lens element 120, a stop 101, a third lens element 130, a fourth lens element 140, a fifth lens element 150, a filter 160 and an image surface 170. The optical imaging lens assembly includes five lens elements (110, 120, 130, 140 and 150) with no additional lens element disposed between each of the adjacent five lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has one inflection point. The image-side surface 112 of the first lens element 110 has one critical point in an off-axis region thereof.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric. The object-side surface 121 of the second lens element 120 has one inflection point. The object-side surface 121 of the second lens element 120 has one critical point in an off-axis region thereof.

The third lens element 130 with negative refractive power has an object-side surface 131 being concave in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has one inflection point. The image-side surface 132 of the third lens element 130 has two inflection points. The image-side surface 132 of the third lens element 130 has one critical point in an off-axis region thereof.

The fourth lens element 140 with positive refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has two inflection points. The image-side surface 142 of the fourth lens element 140 has three inflection points. The object-side surface 141 of the fourth lens element 140 has one critical point in an off-axis region thereof. The image-side surface 142 of the fourth lens element 140 has one critical point in an off-axis region thereof.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The object-side surface 151 of the fifth lens element 150 has three inflection points. The image-side surface 152 of the fifth lens element 150 has three inflection points. The object-side surface 151 of the fifth lens element 150 has one concave critical point and one convex critical point in an off-axis region thereof. The image-side surface 152 of the fifth lens element 150 has one convex critical point in an off-axis region thereof.

The filter 160 is made of glass material and located between the fifth lens element 150 and the image surface 170, and will not affect the focal length of the optical imaging lens assembly. The image sensor 180 is disposed on or near the image surface 170 of the optical imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,
- X is the relative distance between a point on the aspheric surface spaced at a distance Y from an optical axis and the tangential plane at the aspheric surface vertex on the optical axis;
- Y is the vertical distance from the point on the aspheric surface to the optical axis;
- R is the curvature radius;
- k is the conic coefficient; and
- Ai is the i-th aspheric coefficient, and in the embodiments, i may be, but is not limited to, 4, 6, 8, 10, 12, 14, 16, 18 and 20.

In the optical imaging lens assembly of the image capturing unit according to the 1st embodiment, when a focal length of the optical imaging lens assembly is f, an f-number of the optical imaging lens assembly is Fno, and half of a maximum field of view of the optical imaging lens assembly is HFOV, these parameters have the following values: f=3.78 millimeters (mm), Fno=2.05, HFOV=40.4 degrees (deg.).

When a maximum value among refractive indices of all lens elements of the optical imaging lens assembly is Nmax, the following condition is satisfied: Nmax=1.679. In this embodiment, among the first lens element 110, the second lens element 120, the third lens element 130, the fourth lens element 140 and the fifth lens element 150, a refractive index of the second lens element 120 is larger than the refractive indices of the other lens elements, and Nmax is equal to the refractive index of the second lens element 120.

When an Abbe number of the second lens element 120 is V2, the following condition is satisfied: V2=18.4.

When the Abbe number of the second lens element 120 is V2, an Abbe number of the third lens element 130 is V3, and an Abbe number of the fourth lens element 140 is V4, the following condition is satisfied: V2+V3+V4=78.9.

When the Abbe number of the second lens element 120 is V2, and the refractive index of the second lens element 120 is N2, the following condition is satisfied: V2/N2=10.98.

When the Abbe number of the second lens element 120 is V2, the Abbe number of the third lens element 130 is V3, the Abbe number of the fourth lens element 140 is V4, the refractive index of the second lens element 120 is N2, a refractive index of the third lens element 130 is N3, and a refractive index of the fourth lens element 140 is N4, the following condition is satisfied: V2/N2+V3/N3+V4/N4=49.20.

When the Abbe number of the third lens element 130 is V3, the following condition is satisfied: V3=30.2.

When the Abbe number of the fourth lens element 140 is V4, the following condition is satisfied: V4=30.2.

When a minimum value among Abbe numbers of all lens elements of the optical imaging lens assembly is Vmin, the following condition is satisfied: Vmin=18.4. In this embodiment, among the first lens element 110, the second lens element 120, the third lens element 130, the fourth lens element 140 and the fifth lens element 150, the Abbe number of the second lens element 120 is smaller than the Abbe numbers of the other lens elements, and Vmin is equal to the Abbe number of the second lens element 120.

When a sum of central thicknesses of all lens elements of the optical imaging lens assembly is ΣCT, and a sum of axial distances between each of all adjacent lens elements of the optical imaging lens assembly is ΣAT, the following condition is satisfied: ΣCT/ΣAT=1.79. In this embodiment, an axial distance between two adjacent lens elements is an air gap in a paraxial region between the two adjacent lens elements. In this embodiment, ΣCT is the sum of the central thicknesses of the first lens element 110, the second lens element 120, the third lens element 130, the fourth lens element 140 and the fifth lens element 150, and ΣAT is the sum of the axial distance between the first lens element 110 and the second lens element 120, the axial distance between the second lens element 120 and the third lens element 130, the axial distance between the third lens element 130 and the fourth lens element 140, and the axial distance between the fourth lens element 140 and the fifth lens element 150.

When the central thickness of the first lens element 110 is CT1, and the axial distance between the first lens element 110 and the second lens element 120 is T12, the following condition is satisfied: CT1/T12=5.12.

When the central thickness of the third lens element 130 is CT3, and the axial distance between the third lens element 130 and the fourth lens element 140 is T34, the following condition is satisfied: CT3/T34=0.82.

When the central thickness of the fourth lens element 140 is CT4, and the axial distance between the fourth lens element 140 and the fifth lens element 150 is T45, the following condition is satisfied: CT4/T45=0.98.

When the central thickness of the fourth lens element 140 is CT4, and the central thickness of the fifth lens element 150 is CT5, the following condition is satisfied: CT5/CT4=1.79.

When an axial distance between the object-side surface 111 of the first lens element 110 and the image surface 170 is TL, the following condition is satisfied: TL=4.30 [mm].

When the axial distance between the object-side surface 111 of the first lens element 110 and the image surface 170 is TL, and the focal length of the optical imaging lens assembly is f, the following condition is satisfied: TL/f=1.14.

When the axial distance between the object-side surface 111 of the first lens element 110 and the image surface 170 is TL, and a maximum image height of the optical imaging lens assembly is ImgH, the following condition is satisfied: TL/ImgH=1.31.

When a curvature radius of the object-side surface 111 of the first lens element 110 is R1, and a curvature radius of the image-side surface 112 of the first lens element 110 is R2, the following condition is satisfied: (R1+R2)/(R1−R2)=−1.54.

When a curvature radius of the image-side surface 122 of the second lens element 120 is R4, and the focal length of the optical imaging lens assembly is f, the following condition is satisfied: R4/f=1.52.

When a curvature radius of the object-side surface 141 of the fourth lens element 140 is R7, and the focal length of the optical imaging lens assembly is f, the following condition is satisfied: R7/f=1.20.

When a curvature radius of the image-side surface 152 of the fifth lens element 150 is R10, and the maximum image height of the optical imaging lens assembly is ImgH, the following condition is satisfied: R10/ImgH=0.45.

When the focal length of the optical imaging lens assembly is f, a focal length of the third lens element 130 is f3, and a focal length of the fourth lens element 140 is f4, the following condition is satisfied: |f/f3|+|f/f4|=0.34.

When the focal length of the optical imaging lens assembly is f, the focal length of the third lens element 130 is f3, the focal length of the fourth lens element 140 is f4, and a focal length of the fifth lens element 150 is f5, the following condition is satisfied: f/f3+f/f4+f/f5=−0.38.

When the focal length of the optical imaging lens assembly is f, a curvature radius of the object-side surface 131 of the third lens element 130 is R5, and a curvature radius of the image-side surface 132 of the third lens element 130 is R6, the following condition is satisfied: f/|R5|+f/|R6|=0.04.

When the focal length of the optical imaging lens assembly is f, and a curvature radius of the object-side surface 151 of the fifth lens element 150 is R9, the following condition is satisfied: f/R9=1.11.

When a focal length of the first lens element 110 is f1, and a focal length of the second lens element 120 is f2, the following condition is satisfied: |f2/f1|=2.74.

When the focal length of the second lens element 120 is f2, and the focal length of the fifth lens element 150 is f5, the following condition is satisfied: |f2/f5|=1.46.

When the focal length of the fourth lens element 140 is f4, and the focal length of the fifth lens element 150 is f5, the following condition is satisfied: |f4/f5|=2.15.

When the focal length of the optical imaging lens assembly is f, and the focal length of the fifth lens element 150 is f5, the following condition is satisfied: f5/f=−1.49.

When a maximum effective radius of the object-side surface 111 of the first lens element 110 is Y11, and a maximum effective radius of the image-side surface 152 of the fifth lens element 150 is Y52, the following condition is satisfied: Y52/Y11=2.79.

When a vertical distance between the critical point on the image-side surface 112 of the first lens element 110 and the optical axis is Yc12, and a maximum effective radius of the image-side surface 112 of the first lens element 110 is Y12, the following condition is satisfied: Yc12/Y12=0.73.

When a vertical distance between the critical point on the object-side surface 141 of the fourth lens element 140 and the optical axis is Yc41, and a maximum effective radius of the object-side surface 141 of the fourth lens element 140 is Y41, the following condition is satisfied: Yc41/Y41=0.50.

When a vertical distance between the concave critical point on the object-side surface 151 of the fifth lens element 150 and the optical axis is Yc511, and a vertical distance between the convex critical point on the object-side surface 151 of the fifth lens element 150 and the optical axis is Yc512, the following condition is satisfied: Yc512/Yc511=4.13.

When a vertical distance between the convex critical point on the image-side surface 152 of the fifth lens element 150 and the optical axis is Yc52, and the maximum effective radius of the image-side surface 152 of the fifth lens element 150 is Y52, the following condition is satisfied: Yc52/Y52=0.42.

The detailed optical data of the 1st embodiment are shown in Table 1 and the aspheric surface data are shown in Table 2 below.

TABLE 1

1st Embodiment
f = 3.78 mm, Fno = 2.05, HFOV = 40.4 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Ape. Stop | Plano | | −0.334 | | | | |
| 2 | Lens 1 | 1.340 | (ASP) | 0.614 | Plastic | 1.545 | 56.1 | 2.99 |
| 3 | | 6.268 | (ASP) | 0.120 | | | | |
| 4 | Lens 2 | −196.464 | (ASP) | 0.204 | Plastic | 1.679 | 18.4 | −8.20 |
| 5 | | 5.738 | (ASP) | 0.157 | | | | |
| 6 | Stop | Plano | | 0.149 | | | | |
| 7 | Lens 3 | −167.224 | (ASP) | 0.352 | Plastic | 1.582 | 30.2 | −153.10 |
| 8 | | 191.205 | (ASP) | 0.427 | | | | |
| 9 | Lens 4 | 4.512 | (ASP) | 0.369 | Plastic | 1.582 | 30.2 | 12.12 |
| 10 | | 12.119 | (ASP) | 0.377 | | | | |
| 11 | Lens 5 | 3.410 | (ASP) | 0.662 | Plastic | 1.534 | 55.9 | −5.63 |
| 12 | | 1.489 | (ASP) | 0.400 | | | | |
| 13 | Filter | Plano | | 0.110 | Glass | 1.517 | 64.2 | — |
| 14 | | Plano | | 0.362 | | | | |
| 15 | Image | Plano | | — | | | | |

Note:
Reference wavelength is 587.6 nm (d-line).
An effective radius of the stop 101 (Surface 6) is 0.775 mm.

TABLE 2

Aspheric Coefficients

| Surface # | 2 | 3 | 4 | 5 | 7 |
|---|---|---|---|---|---|
| k = | 1.3988E−01 | 1.7949E+01 | −9.9000E+01 | −2.2521E+01 | 9.9000E+01 |
| A4 = | −2.9077E−02 | −1.0958E−01 | −1.1837E−01 | −2.5667E−02 | −2.8945E−01 |
| A6 = | 8.3565E−02 | −2.1733E−02 | 4.7618E−01 | 3.9412E−01 | 1.2388E−01 |
| A8 = | −3.5761E−01 | 3.0522E−01 | −6.9703E−01 | −1.0590E−01 | 3.1464E−01 |
| A10 = | 6.4464E−01 | −8.2937E−01 | 1.4291E+00 | 1.2626E−01 | −2.5726E+00 |
| A12 = | −7.1245E−01 | 1.0199E+00 | −2.4820E+00 | −1.1380E+00 | 6.6606E+00 |
| A14 = | 3.7765E−01 | −6.7681E−01 | 2.4631E+00 | 2.4809E+00 | −8.0519E+00 |
| A16 = | −1.0206E−01 | 1.8393E−01 | −9.7355E−01 | −1.3312E+00 | 3.9794E+00 |

| Surface # | 8 | 9 | 10 | 11 | 12 |
|---|---|---|---|---|---|
| k = | 9.9000E+01 | −2.2087E+01 | −9.4784E+01 | −1.7046E+00 | −1.0421E+00 |
| A4 = | −2.9003E−01 | −7.7667E−02 | −1.4336E−01 | −4.0706E−01 | −3.2854E−01 |
| A6 = | 3.9331E−01 | 9.1403E−02 | 3.0092E−01 | 2.7808E−01 | 2.2151E−01 |
| A8 = | −1.8587E+00 | −3.6326E−01 | −5.5556E−01 | −1.5135E−01 | −1.2256E−01 |
| A10 = | 6.3382E+00 | 3.9796E−01 | 5.8792E−01 | 7.1785E−02 | 4.7556E−02 |
| A12 = | −1.4016E+01 | −2.0185E−01 | −4.1929E−01 | −2.4338E−02 | −1.2193E−02 |
| A14 = | 1.9751E+01 | −4.8727E−02 | 2.0098E−01 | 5.3122E−03 | 1.9858E−03 |
| A16 = | −1.7002E+01 | 1.1361E−01 | −5.9672E−02 | −7.0655E−04 | −1.9506E−04 |
| A18 = | 8.1700E+00 | −4.7906E−02 | 9.7184E−03 | 5.2196E−05 | 1.0454E−05 |
| A20 = | −1.6716E+00 | 6.5132E−03 | −6.5945E−04 | −1.6454E−06 | −2.3352E−07 |

In Table 1, the curvature radius, the thickness and the focal length are shown in millimeters (mm). Surface numbers 0-15 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
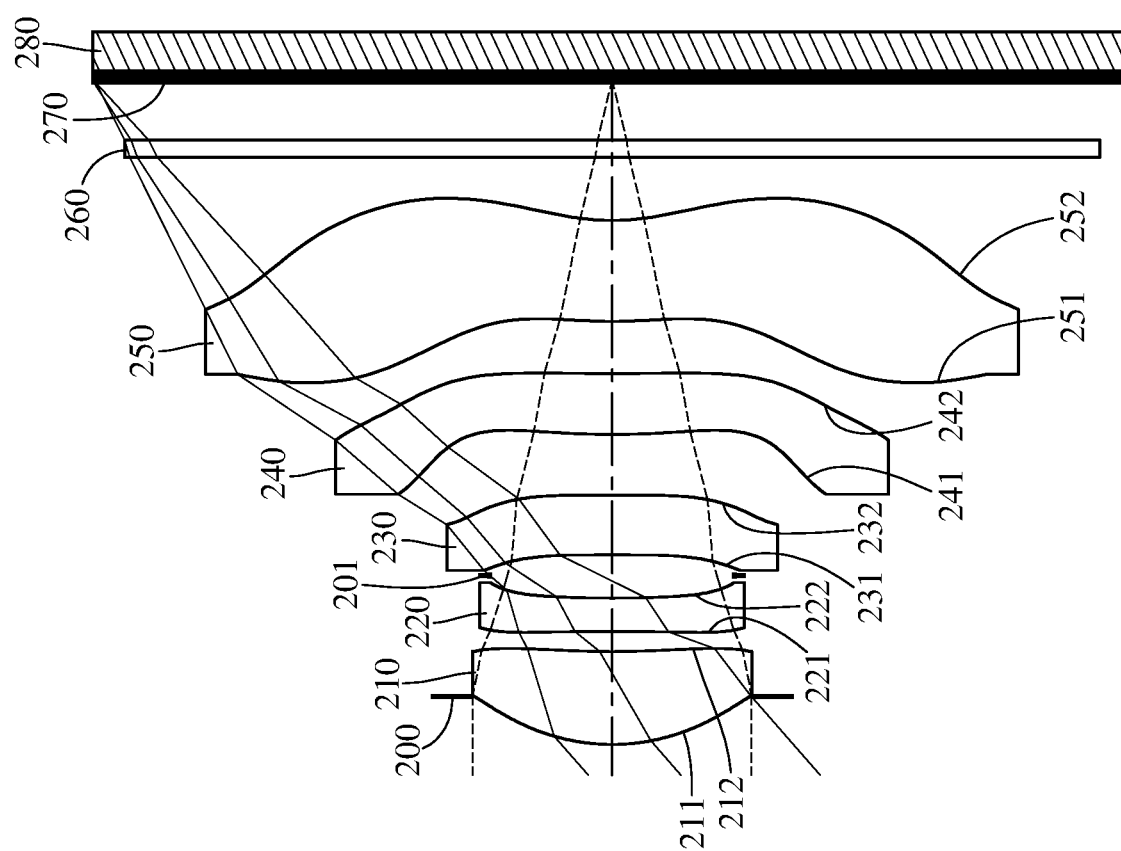
FIG. 3 is a schematic view of an image capturing unit according to the 2nd embodiment of the present disclosure.
Figure 4:
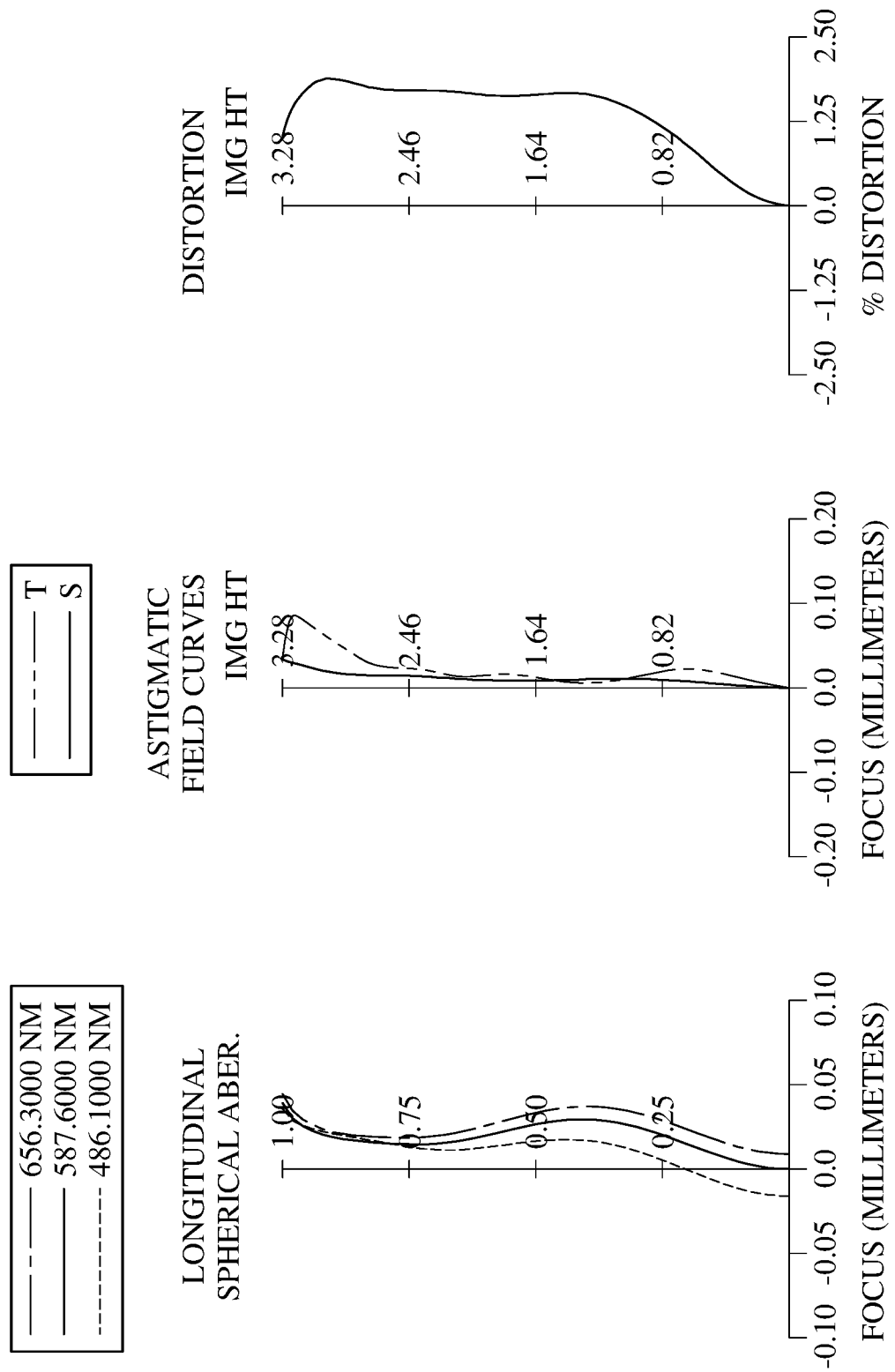
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens assembly (its reference numeral is omitted) of the present disclosure and an image sensor 280. The optical imaging lens assembly includes, in order from an object side to an image side, an aperture stop 200, a first lens element 210, a second lens element 220, a stop 201, a third lens element 230, a fourth lens element 240, a fifth lens element 250, a filter 260 and an image surface 270. The optical imaging lens assembly includes five lens elements (210, 220, 230, 240 and 250) with no additional lens element disposed between each of the adjacent five lens elements.

The first lens element 210 with positive refractive power has an object-side surface 211 being convex in a paraxial region thereof and an image-side surface 212 being concave in a paraxial region thereof. The first lens element 210 is made of glass material and has the object-side surface 211 and the image-side surface 212 being both aspheric. The object-side surface 211 of the first lens element 210 has one inflection point. The image-side surface 212 of the first lens element 210 has one critical point in an off-axis region thereof.

The second lens element 220 with negative refractive power has an object-side surface 221 being concave in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has one inflection point. The object-side surface 221 of the second lens element 220 has one critical point in an off-axis region thereof.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has one inflection point. The image-side surface 232 of the third lens element 230 has two inflection points. The object-side surface 231 of the third lens element 230 has one critical point in an off-axis region thereof. The image-side surface 232 of the third lens element 230 has one critical point in an off-axis region thereof.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has two inflection points. The image-side surface 242 of the fourth lens element 240 has three inflection points. The object-side surface 241 of the fourth lens element 240 has one critical point in an off-axis region thereof. The image-side surface 242 of the fourth lens element 240 has one critical point in an off-axis region thereof.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The object-side surface 251 of the fifth lens element 250 has three inflection points. The image-side surface 252 of the fifth lens element 250 has three inflection points. The object-side surface 251 of the fifth lens element 250 has one concave critical point and one convex critical point in an off-axis region thereof. The image-side surface 252 of the fifth lens element 250 has one convex critical point in an off-axis region thereof.

The filter 260 is made of glass material and located between the fifth lens element 250 and the image surface 270, and will not affect the focal length of the optical imaging lens assembly. The image sensor 280 is disposed on or near the image surface 270 of the optical imaging lens assembly.

The detailed optical data of the 2nd embodiment are shown in Table 3 and the aspheric surface data are shown in Table 4 below.

TABLE 3

2nd Embodiment
f = 3.65 mm, Fno = 2.10, HFOV = 41.1 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Ape. Stop | Plano | | −0.304 | | | | |
| 2 | Lens 1 | 1.313 | (ASP) | 0.589 | Glass | 1.542 | 62.9 | 3.02 |
| 3 | | 5.537 | (ASP) | 0.127 | | | | |
| 4 | Lens 2 | −55.985 | (ASP) | 0.212 | Plastic | 1.669 | 19.5 | −9.66 |
| 5 | | 7.318 | (ASP) | 0.143 | | | | |
| 6 | Stop | Plano | | 0.131 | | | | |
| 7 | Lens 3 | 191.205 | (ASP) | 0.379 | Plastic | 1.566 | 37.4 | −180.41 |
| 8 | | 66.520 | (ASP) | 0.385 | | | | |
| 9 | Lens 4 | 4.987 | (ASP) | 0.386 | Plastic | 1.582 | 30.2 | 12.67 |
| 10 | | 14.938 | (ASP) | 0.331 | | | | |
| 11 | Lens 5 | 3.095 | (ASP) | 0.640 | Plastic | 1.534 | 55.9 | −5.55 |
| 12 | | 1.404 | (ASP) | 0.400 | | | | |
| 13 | Filter | Plano | | 0.110 | Glass | 1.517 | 64.2 | — |
| 14 | | Plano | | 0.361 | | | | |
| 15 | Image | Plano | | — | | | | |

Note:
Reference wavelength is 587.6 nm (d-line).
An effective radius of the stop 201 (Surface 6) is 0.775 mm.

TABLE 4

| | | Aspheric Coefficients | | | |
|---|---|---|---|---|---|
| Surface # | 2 | 3 | 4 | 5 | 7 |
| k = | 9.6438E−02 | 6.5071E+00 | 9.9000E+01 | −4.3484E+01 | −9.9000E+01 |
| A4 = | −2.4309E−02 | −9.7493E−02 | −1.0333E−01 | −5.8075E−02 | −3.0287E−01 |
| A6 = | 6.3861E−02 | −1.4112E−01 | 1.2748E−01 | 5.5024E−01 | 2.8045E−01 |
| A8 = | −3.1702E−01 | 8.3914E−01 | 1.2442E+00 | −1.2100E+00 | −1.0074E+00 |
| A10 = | 6.4689E−01 | −2.6984E+00 | −4.9328E+00 | 4.3195E+00 | 3.2636E+00 |
| A12 = | −8.8444E−01 | 4.7168E+00 | 9.6861E+00 | −9.3477E+00 | −7.2161E+00 |
| A14 = | 6.0999E−01 | −4.3259E+00 | −9.6292E+00 | 1.0915E+01 | 8.7239E+00 |
| A16 = | −2.1272E−01 | 1.5838E+00 | 3.8266E+00 | −4.9873E+00 | −4.0819E+00 |
| Surface # | 8 | 9 | 10 | 11 | 12 |
| k = | 9.9000E+01 | −3.3482E+01 | −9.9000E+01 | −2.5697E+00 | −9.8825E−01 |
| A4 = | −1.8951E−01 | 2.2447E−02 | −7.2088E−02 | −4.2763E−01 | −3.7168E−01 |
| A6 = | −6.4183E−01 | −4.2043E−01 | −4.7039E−02 | 2.0137E−01 | 2.5377E−01 |
| A8 = | 3.8909E+00 | 1.0153E+00 | 1.8774E−01 | −2.0380E−02 | −1.4307E−01 |
| A10 = | −1.3091E+01 | −1.9449E+00 | −3.1107E−01 | −1.3477E−02 | 5.7340E−02 |
| A12 = | 2.7205E+01 | 2.3971E+00 | 2.4587E−01 | 5.9930E−03 | −1.5308E−02 |
| A14 = | −3.5355E+01 | −1.9780E+00 | −1.0095E−01 | −1.1444E−03 | 2.6051E−03 |
| A16 = | 2.7950E+01 | 1.0410E+00 | 2.1730E−02 | 1.1789E−04 | −2.6822E−04 |
| A18 = | −1.2175E+01 | −3.0392E−01 | −2.1939E−03 | −6.2502E−06 | 1.5143E−05 |
| A20 = | 2.2252E+00 | 3.6712E−02 | 6.7214E−05 | 1.2740E−07 | −3.5925E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.65 | TL/ImgH | 1.28 |
| Fno | 2.10 | (R1 + R2)/(R1 − R2) | −1.62 |
| HFOV [deg.] | 41.1 | R4/f | 2.01 |
| Nmax | 1.669 | R7/f | 1.37 |
| V2 | 19.5 | R10/ImgH | 0.43 |
| V2 + V3 + V4 | 87.1 | |f/f3| + |f/f4| | 0.31 |
| V2/N2 | 11.65 | f/f3 + f/f4 + f/f5 | −0.39 |
| V2/N2 + V3/N3 + V4/N4 | 54.67 | f/|R5| + f/|R6| | 0.07 |
| V3 | 37.4 | f/R9 | 1.18 |
| V4 | 30.2 | |f2/f1| | 3.19 |
| Vmin | 19.5 | |f2/f5| | 1.74 |
| ΣCT/ΣAT | 1.97 | |f4/f5| | 2.28 |
| CT1/T12 | 4.64 | f5/f | −1.52 |
| CT3/T34 | 0.98 | Y52/Y11 | 2.91 |
| CT4/T45 | 1.17 | Yc12/Y12 | 0.75 |
| CT5/CT4 | 1.66 | Yc41/Y41 | 0.48 |
| TL [mm] | 4.19 | Yc512/Yc511 | 4.12 |
| TL/f | 1.15 | Yc52/Y52 | 0.41 |

3rd Embodiment

Figure 5:
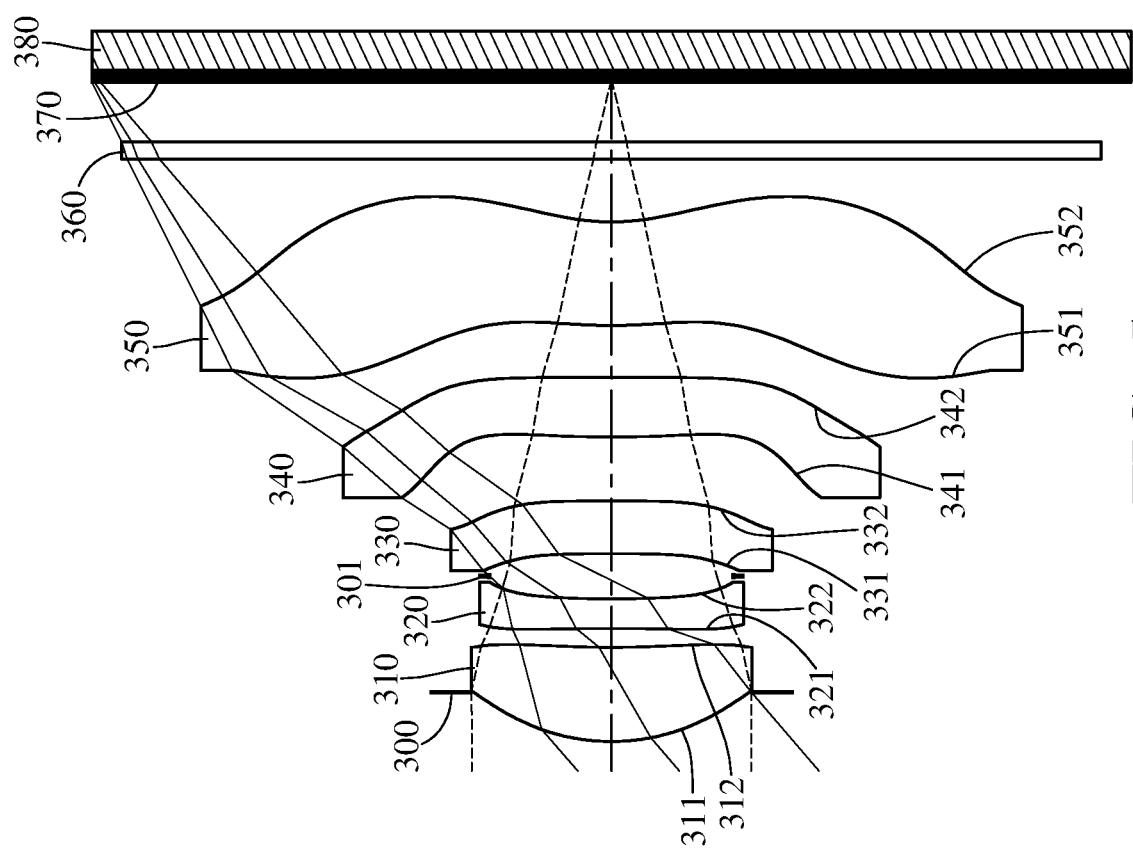
FIG. 5 is a schematic view of an image capturing unit according to the 3rd embodiment of the present disclosure.
Figure 6:
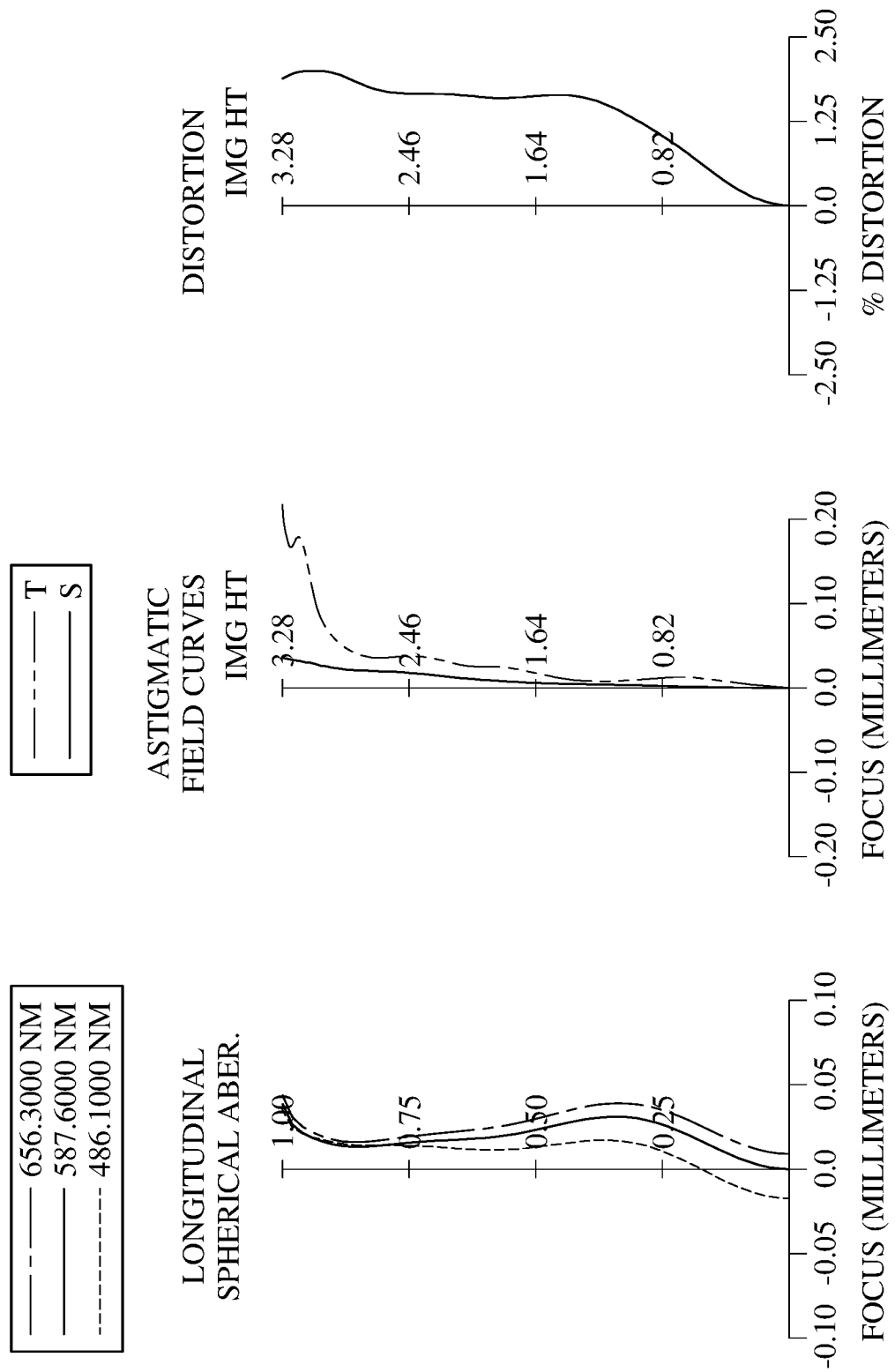
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens assembly (its reference numeral is omitted) of the present disclosure and an image sensor 380. The optical imaging lens assembly includes, in order from an object side to an image side, an aperture stop 300, a first lens element 310, a second lens element 320, a stop 301, a third lens element 330, a fourth lens element 340, a fifth lens element 350, a filter 360 and an image surface 370. The optical imaging lens assembly includes five lens elements (310, 320, 330, 340 and 350) with no additional lens element disposed between each of the adjacent five lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. The object-side surface 311 of the first lens element 310 has one inflection point. The image-side surface 312 of the first lens element 310 has one critical point in an off-axis region thereof.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has one inflection point. The object-side surface 321 of the second lens element 320 has one critical point in an off-axis region thereof.

The third lens element 330 has an object-side surface 331 being planar in a paraxial region thereof and an image-side surface 332 being planar in a paraxial region thereof. The third lens element 330 is made of plastic material and has the object-side surface 331 and the image-side surface 332 being both aspheric. The image-side surface 332 of the third lens element 330 has one inflection point.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has two inflection points. The image-side surface 342 of the fourth lens element 340 has two inflection points. The object-side surface 341 of the fourth lens element 340 has one critical point in an off-axis region thereof.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The object-side surface 351 of the fifth lens element 350 has three inflection points. The image-side surface 352 of the fifth lens element 350 has three inflection points. The object-side surface 351 of the fifth lens element 350 has one concave critical point and one convex critical point in an off-axis region thereof. The image-side surface 352 of the fifth lens element 350 has one convex critical point in an off-axis region thereof.

The filter 360 is made of glass material and located between the fifth lens element 350 and the image surface 370, and will not affect the focal length of the optical imaging lens assembly. The image sensor 380 is disposed on or near the image surface 370 of the optical imaging lens assembly.

The detailed optical data of the 3rd embodiment are shown in Table 5 and the aspheric surface data are shown in Table 6 below.

TABLE 5

3rd Embodiment
f = 3.65 mm, Fno = 2.09, HFOV = 40.8 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Ape. Stop | Plano | | −0.313 | | | | |
| 2 | Lens 1 | 1.307 | (ASP) | 0.599 | Plastic | 1.545 | 56.1 | 2.95 |
| 3 | | 5.903 | (ASP) | 0.119 | | | | |
| 4 | Lens 2 | −66.205 | (ASP) | 0.189 | Plastic | 1.686 | 18.4 | −8.43 |
| 5 | | 6.348 | (ASP) | 0.145 | | | | |
| 6 | Stop | Plano | | 0.142 | | | | |
| 7 | Lens 3 | ∞ | (ASP) | 0.336 | Plastic | 1.584 | 28.2 | ∞ |
| 8 | | — | (ASP) | 0.407 | | | | |
| 9 | Lens 4 | 8.122 | (ASP) | 0.380 | Plastic | 1.584 | 28.2 | 13.13 |
| 10 | | −136.799 | (ASP) | 0.329 | | | | |
| 11 | Lens 5 | 2.881 | (ASP) | 0.659 | Plastic | 1.534 | 55.9 | −5.81 |
| 12 | | 1.375 | (ASP) | 0.400 | | | | |
| 13 | Filter | Plano | | 0.110 | Glass | 1.517 | 64.2 | — |
| 14 | | Plano | | 0.378 | | | | |
| 15 | Image | Plano | | — | | | | |

Note:
Reference wavelength is 587.6 nm (d-line).
An effective radius of the stop 301 (Surface 6) is 0.775 mm.

TABLE 6

Aspheric Coefficients

| Surface # | 2 | 3 | 4 | 5 | 7 |
|---|---|---|---|---|---|
| k = | 1.1083E−01 | 8.6902E+00 | −9.9000E+01 | −3.0830E+01 | 0.0000E+00 |
| A4 = | −3.2358E−02 | −1.0203E−01 | −1.1580E−01 | −4.5097E−02 | −2.9675E−01 |
| A6 = | 1.4153E−01 | −1.4048E−01 | 1.9775E−01 | 4.0953E−01 | 1.9362E−01 |
| A8 = | −6.2798E−01 | 9.9413E−01 | 1.2360E+00 | −2.7712E−02 | −1.1338E+00 |
| A10 = | 1.3488E+00 | −3.1368E+00 | −5.0795E+00 | 5.6301E−02 | 5.0058E+00 |
| A12 = | −1.7667E+00 | 5.2985E+00 | 9.5976E+00 | −1.3529E+00 | −1.2171E+01 |
| A14 = | 1.2144E+00 | −4.7561E+00 | −9.1758E+00 | 3.0989E+00 | 1.4871E+01 |
| A16 = | −3.9050E−01 | 1.7284E+00 | 3.5453E+00 | −1.8498E+00 | −6.9481E+00 |

| Surface # | 8 | 9 | 10 | 11 | 12 |
|---|---|---|---|---|---|
| k = | 0.0000E+00 | −1.2330E+01 | 9.9000E+01 | −4.3392E+00 | −9.7670E−01 |
| A4 = | −1.9953E−01 | 4.6278E−02 | −2.5082E−02 | −3.7432E−01 | −3.5377E−01 |
| A6 = | −4.3834E−01 | −3.8049E−01 | 3.5453E−02 | 2.2809E−01 | 2.3906E−01 |
| A8 = | 2.3963E+00 | 7.6774E−01 | −1.4353E−01 | −9.1928E−02 | −1.3348E−01 |
| A10 = | −7.8381E+00 | −1.6252E+00 | 1.5042E−01 | 3.2008E−02 | 5.2189E−02 |
| A12 = | 1.6256E+01 | 2.3222E+00 | −1.1720E−01 | −8.9586E−03 | −1.3480E−02 |
| A14 = | −2.0982E+01 | −2.1876E+00 | 7.1978E−02 | 1.7432E−03 | 2.2114E−03 |
| A16 = | 1.6159E+01 | 1.2680E+00 | −2.7405E−02 | −2.1298E−04 | −2.1904E−04 |
| A18 = | −6.5579E+00 | −3.9557E−01 | 5.4590E−03 | 1.4586E−05 | 1.1877E−05 |
| A20 = | 1.0278E+00 | 5.0132E−02 | −4.3585E−04 | −4.2711E−07 | −2.6998E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.65 | TL/ImgH | 1.28 |
| Fno | 2.09 | (R1 + R2)/(R1 − R2) | −1.57 |
| HFOV [deg.] | 40.8 | R4/f | 1.74 |
| Nmax | 1.686 | R7/f | 2.22 |
| V2 | 18.4 | R10/ImgH | 0.42 |
| V2 + V3 + V4 | 74.8 | |f/f3| + |f/f4| | 0.28 |
| V2/N2 | 10.90 | f/f3 + f/f4 + f/f5 | −0.35 |
| V2/N2 + V3/N3 + V4/N4 | 46.51 | f/|R5| + f/|R6| | 0.00 |
| V3 | 28.2 | f/R9 | 1.27 |
| V4 | 28.2 | |f2/f1| | 2.86 |
| Vmin | 18.4 | |f2/f5| | 1.45 |
| ΣCT/ΣAT | 1.89 | |f4/f5| | 2.26 |
| CT1/T12 | 5.03 | f5/f | −1.59 |
| CT3/T34 | 0.83 | Y52/Y11 | 2.93 |
| CT4/T45 | 1.16 | Yc12/Y12 | 0.75 |
| CT5/CT4 | 1.73 | Yc41/Y41 | 0.47 |
| TL [mm] | 4.19 | Yc512/Yc511 | 3.72 |
| TL/f | 1.15 | Yc52/Y52 | 0.43 |

4th Embodiment

Figure 7:
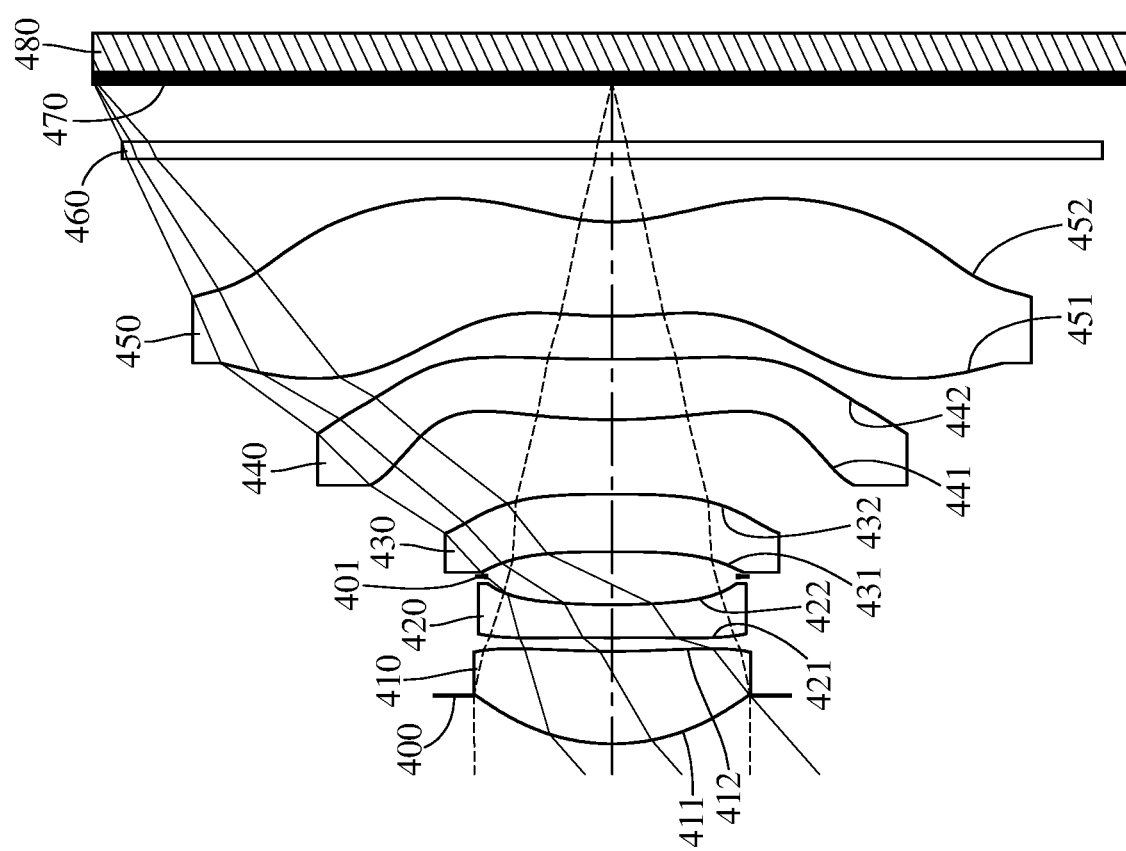
FIG. 7 is a schematic view of an image capturing unit according to the 4th embodiment of the present disclosure.
Figure 8:
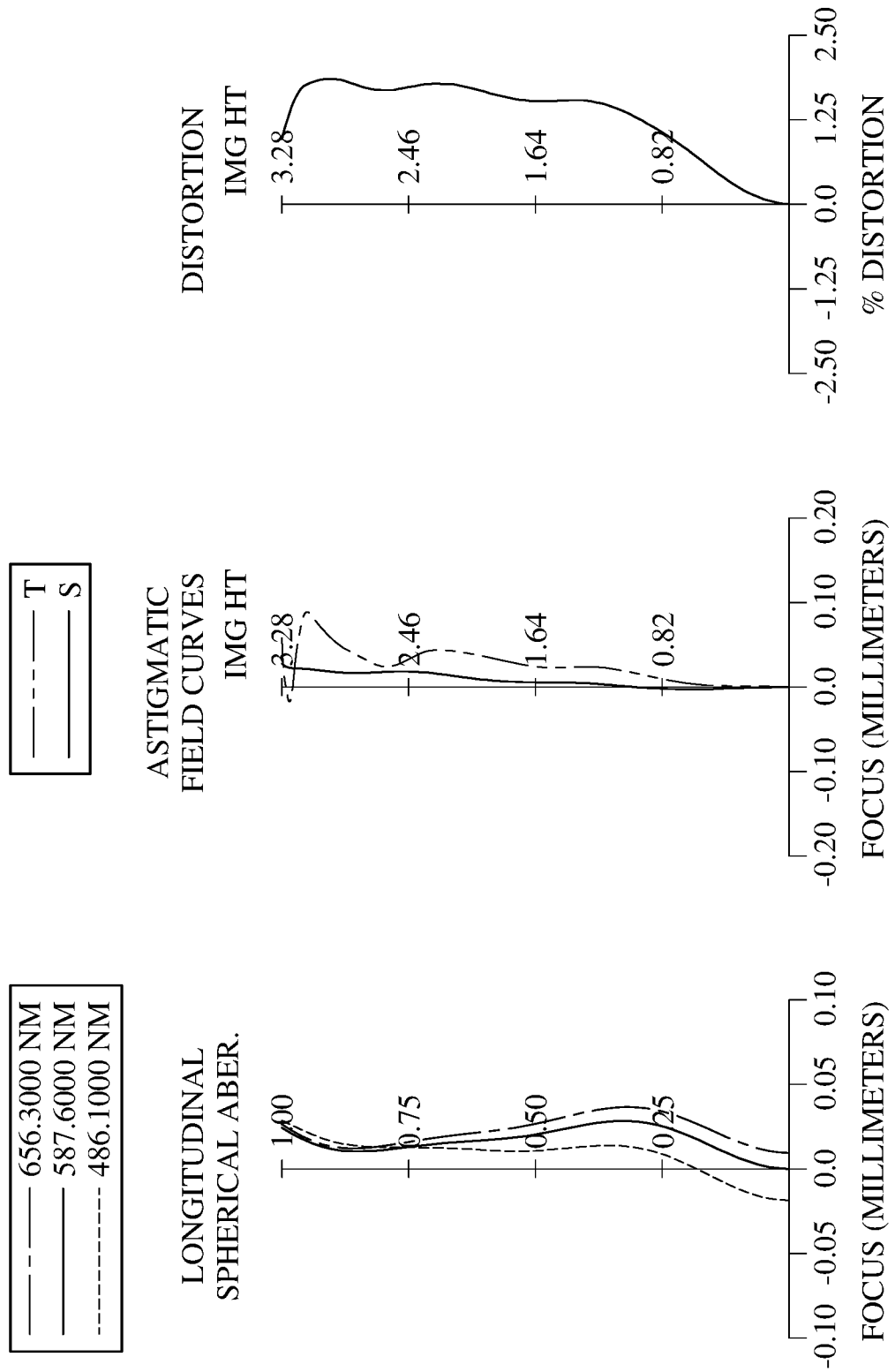
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens assembly (its reference numeral is omitted) of the present disclosure and an image sensor 480. The optical imaging lens assembly includes, in order from an object side to an image side, an aperture stop 400, a first lens element 410, a second lens element 420, a stop 401, a third lens element 430, a fourth lens element 440, a fifth lens element 450, a filter 460 and an image surface 470. The optical imaging lens assembly includes five lens elements (410, 420, 430, 440 and 450) with no additional lens element disposed between each of the adjacent five lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has one inflection point. The image-side surface 412 of the first lens element 410 has one critical point in an off-axis region thereof.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric. The object-side surface 421 of the second lens element 420 has two inflection points. The object-side surface 421 of the second lens element 420 has two critical points in an off-axis region thereof.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric. The image-side surface 432 of the third lens element 430 has one inflection point.

The fourth lens element 440 with positive refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has two inflection points. The image-side surface 442 of the fourth lens element 440 has four inflection points. The object-side surface 441 of the fourth lens element 440 has one critical point in an off-axis region thereof. The image-side surface 442 of the fourth lens element 440 has one critical point in an off-axis region thereof.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has three inflection points. The image-side surface 452 of the fifth lens element 450 has three inflection points. The object-side surface 451 of the fifth lens element 450 has one concave critical point and one convex critical point in an off-axis region thereof. The image-side surface 452 of the fifth lens element 450 has one convex critical point in an off-axis region thereof.

The filter 460 is made of glass material and located between the fifth lens element 450 and the image surface 470, and will not affect the focal length of the optical imaging lens assembly. The image sensor 480 is disposed on or near the image surface 470 of the optical imaging lens assembly.

The detailed optical data of the 4th embodiment are shown in Table 7 and the aspheric surface data are shown in Table 8 below.

TABLE 7

4th Embodiment
f = 3.62 mm, Fno = 2.10, HFOV = 41.4 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Ape. Stop | Plano | | −0.307 | | | | |
| 2 | Lens 1 | 1.308 | (ASP) | 0.588 | Plastic | 1.545 | 56.1 | 3.00 |
| 3 | | 5.506 | (ASP) | 0.086 | | | | |

TABLE 7-continued

4th Embodiment
f = 3.62 mm, Fno = 2.10, HFOV = 41.4 deg.

| Surface # | | Curvature Radius | | Thickness | Material | Index | Abbe # | Focal Length |
|---|---|---|---|---|---|---|---|---|
| 4 | Lens 2 | 36.347 | (ASP) | 0.210 | Plastic | 1.669 | 19.4 | −8.49 |
| 5 | | 4.901 | (ASP) | 0.180 | | | | |
| 6 | Stop | Plano | | 0.157 | | | | |
| 7 | Lens 3 | −14.842 | (ASP) | 0.366 | Plastic | 1.566 | 37.4 | 76.24 |
| 8 | | −11.142 | (ASP) | 0.473 | | | | |
| 9 | Lens 4 | 4.240 | (ASP) | 0.384 | Plastic | 1.566 | 37.4 | 11.91 |
| 10 | | 11.055 | (ASP) | 0.274 | | | | |
| 11 | Lens 5 | 2.754 | (ASP) | 0.599 | Plastic | 1.534 | 55.9 | −5.34 |
| 12 | | 1.295 | (ASP) | 0.400 | | | | |
| 13 | Filter | Plano | | 0.110 | Glass | 1.517 | 64.2 | — |
| 14 | | Plano | | 0.364 | | | | |
| 15 | Image | Plano | | — | | | | |

Note:
Reference wavelength is 587.6 nm (d-line).
An effective radius of the stop 401 (Surface 6) is 0.800 mm.

TABLE 8

Aspheric Coefficients

| Surface # | 2 | 3 | 4 | 5 | 7 |
|---|---|---|---|---|---|
| k = | −4.2309E−02 | 1.6854E+01 | −9.9000E+01 | −1.2888E+01 | −3.0875E+01 |
| A4 = | −2.7285E−02 | −1.4551E−01 | −1.4165E−01 | −6.5656E−03 | −2.5252E−01 |
| A6 = | 2.1071E−01 | −1.3029E−01 | 1.6328E−01 | 2.6528E−01 | 1.0756E−01 |
| A8 = | −9.6562E−01 | 1.0493E+00 | 1.2171E+00 | 4.5272E−01 | −5.9641E−01 |
| A10 = | 2.3945E+00 | −2.8265E+00 | −4.2543E+00 | −1.1599E+00 | 2.6774E+00 |
| A12 = | −3.5301E+00 | 3.9711E+00 | 6.9112E+00 | 5.3901E−01 | −6.9379E+00 |
| A14 = | 2.7812E+00 | −3.1092E+00 | −5.9155E+00 | 1.1795E+00 | 9.1711E+00 |
| A16 = | −9.7079E−01 | 1.0212E+00 | 2.1418E+00 | −9.2383E−01 | −5.1346E+00 |
| A18 = | — | — | — | — | 6.2447E−01 |

| Surface # | 8 | 9 | 10 | 11 | 12 |
|---|---|---|---|---|---|
| k = | 3.2766E+01 | 8.6977E−01 | −5.2379E+01 | −2.4179E+00 | −1.0629E+00 |
| A4 = | −2.1667E−01 | 5.8512E−02 | 8.1312E−03 | −4.3977E−01 | −4.1219E−01 |
| A6 = | 5.4045E−03 | −3.8471E−01 | −1.5650E−01 | 1.8434E−01 | 2.9988E−01 |
| A8 = | −7.1953E−02 | 6.7087E−01 | 2.6519E−01 | −1.1152E−03 | −1.7888E−01 |
| A10 = | 4.3069E−01 | −8.9777E−01 | −3.0267E−01 | −2.1460E−02 | 7.6613E−02 |
| A12 = | −8.2088E−01 | 7.6396E−01 | 1.9232E−01 | 7.7565E−03 | −2.1834E−02 |
| A14 = | 7.2058E−01 | −4.3223E−01 | −6.7631E−02 | −1.3702E−03 | 3.9563E−03 |
| A16 = | −2.2121E−01 | 1.6023E−01 | 1.3120E−02 | 1.3515E−04 | −4.3399E−04 |
| A18 = | — | −3.4135E−02 | −1.3026E−03 | −7.0872E−06 | 2.6196E−05 |
| A20 = | — | 3.0804E−03 | 5.0754E−05 | 1.5263E−07 | −6.6735E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.62 | TL/ImgH | 1.28 |
| Fno | 2.10 | (R1 + R2)/(R1 − R2) | −1.62 |
| HFOV [deg.] | 41.4 | R4/f | 1.35 |
| Nmax | 1.669 | R7/f | 1.17 |
| V2 | 19.4 | R10/ImgH | 0.39 |
| V2 + V3 + V4 | 94.3 | |f/f3| + |f/f4| | 0.35 |
| V2/N2 | 11.65 | f/f3 + f/f4 + f/f5 | −0.33 |

-continued

| 4th Embodiment | | | |
|---|---|---|---|
| V2/N2 + V3/N3 + V4/N4 | 59.46 | f/|R5| + f/|R6| | 0.57 |
| V3 | 37.4 | f/R9 | 1.31 |
| V4 | 37.4 | |f2/f1| | 2.83 |
| Vmin | 19.4 | |f2/f5| | 1.59 |
| ΣCT/ΣAT | 1.84 | |f4/f5| | 2.23 |
| CT1/T12 | 6.84 | f5/f | −1.48 |
| CT3/T34 | 0.77 | Y52/Y11 | 3.03 |
| CT4/T45 | 1.40 | Yc12/Y12 | 0.73 |
| CT5/CT4 | 1.56 | Yc41/Y41 | 0.53 |
| TL [mm] | 4.19 | Yc512/Yc511 | 3.87 |
| TL/f | 1.16 | Yc52/Y52 | 0.39 |

5th Embodiment

Figure 9:
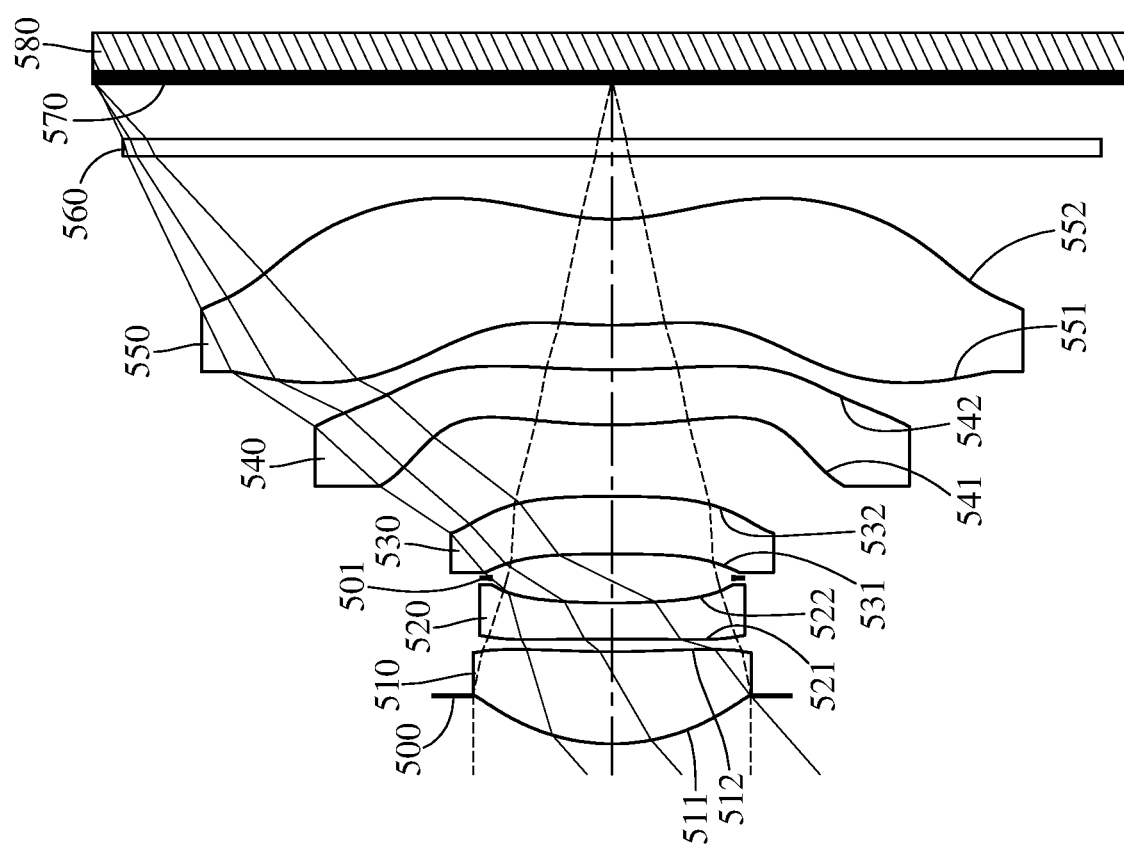
FIG. 9 is a schematic view of an image capturing unit according to the 5th embodiment of the present disclosure.
Figure 10:
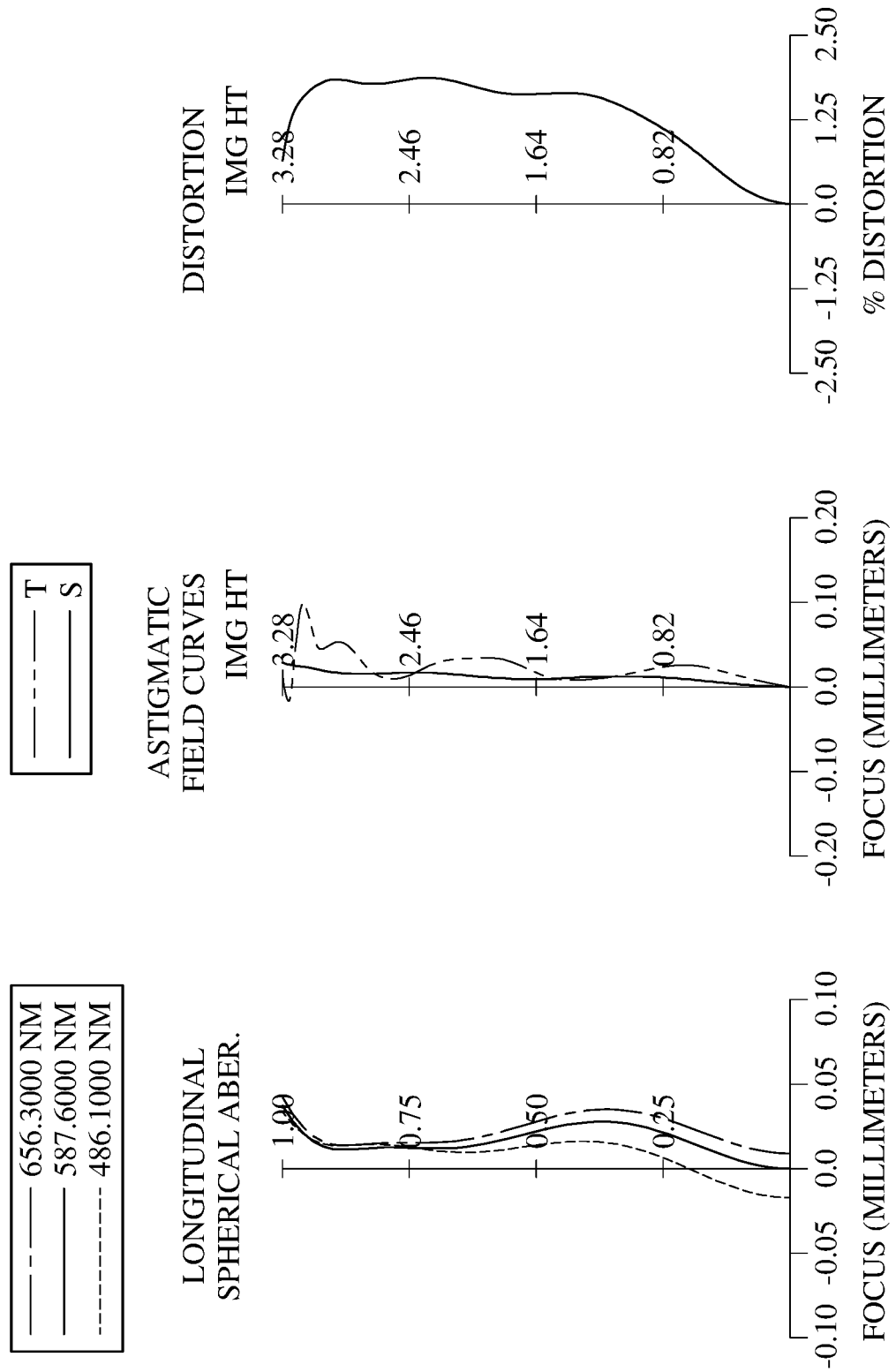
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens assembly (its reference numeral is omitted) of the present disclosure and an image sensor 580. The optical imaging lens assembly includes, in order from an object side to an image side, an aperture stop 500, a first lens element 510, a second lens element 520, a stop 501, a third lens element 530, a fourth lens element 540, a fifth lens element 550, a filter 560 and an image surface 570. The optical imaging lens assembly includes five lens elements (510, 520, 530, 540 and 550) with no additional lens element disposed between each of the adjacent five lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has one inflection point. The image-side surface 512 of the first lens element 510 has one critical point in an off-axis region thereof.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric. The object-side surface 521 of the second lens element 520 has two inflection points. The object-side surface 521 of the second lens element 520 has two critical points in an off-axis region thereof.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric. The object-side surface 531 of the third lens element 530 has one inflection point. The image-side surface 532 of the third lens element 530 has one inflection point.

The fourth lens element 540 with positive refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has three inflection points. The image-side surface 542 of the fourth lens element 540 has three inflection points. The object-side surface 541 of the fourth lens element 540 has one critical point in an off-axis region thereof. The image-side surface 542 of the fourth lens element 540 has one critical point in an off-axis region thereof.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The object-side surface 551 of the fifth lens element 550 has three inflection points. The image-side surface 552 of the fifth lens element 550 has three inflection points. The object-side surface 551 of the fifth lens element 550 has one concave critical point and one convex critical point in an off-axis region thereof. The image-side surface 552 of the fifth lens element 550 has one convex critical point in an off-axis region thereof.

The filter 560 is made of glass material and located between the fifth lens element 550 and the image surface 570, and will not affect the focal length of the optical imaging lens assembly. The image sensor 580 is disposed on or near the image surface 570 of the optical imaging lens assembly.

The detailed optical data of the 5th embodiment are shown in Table 9 and the aspheric surface data are shown in Table 10 below.

TABLE 9

5th Embodiment
f = 3.63 mm, Fno = 2.10, HFOV = 41.3 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Ape. Stop | Plano | | −0.305 | | | | |
| 2 | Lens 1 | 1.311 | (ASP) | 0.585 | Plastic | 1.545 | 56.1 | 2.96 |
| 3 | | 5.908 | (ASP) | 0.079 | | | | |
| 4 | Lens 2 | 70.876 | (ASP) | 0.230 | Plastic | 1.669 | 19.5 | −8.11 |
| 5 | | 5.033 | (ASP) | 0.159 | | | | |
| 6 | Stop | Plano | | 0.152 | | | | |
| 7 | Lens 3 | −17.787 | (ASP) | 0.366 | Plastic | 1.566 | 37.4 | 42.74 |
| 8 | | −10.327 | (ASP) | 0.454 | | | | |
| 9 | Lens 4 | 3.551 | (ASP) | 0.349 | Plastic | 1.566 | 37.4 | 21.69 |
| 10 | | 4.819 | (ASP) | 0.284 | | | | |
| 11 | Lens 5 | 2.921 | (ASP) | 0.672 | Plastic | 1.534 | 55.9 | −6.20 |
| 12 | | 1.427 | (ASP) | 0.400 | | | | |
| 13 | Filter | Plano | | 0.110 | Glass | 1.517 | 64.2 | — |
| 14 | | Plano | | 0.350 | | | | |
| 15 | Image | Plano | | — | | | | |

Note:
Reference wavelength is 587.6 nm (d-line).
An effective radius of the stop 501 (Surface 6) is 0.770 mm.

TABLE 10

Aspheric Coefficients

| Surface # | 2 | 3 | 4 | 5 | 7 |
|---|---|---|---|---|---|
| k = | 1.4248E−01 | 8.8224E−01 | −8.1242E+01 | −1.4520E+01 | 9.6644E+01 |
| A4 = | −2.4358E−02 | −1.4208E−01 | −1.3433E−01 | −7.8559E−03 | −2.5553E−01 |
| A6 = | 5.5473E−02 | −1.2432E−01 | 1.8094E−01 | 3.8264E−01 | 1.6120E−01 |
| A8 = | −2.6949E−01 | 1.3492E+00 | 1.3492E+00 | −1.9596E−01 | −1.1151E+00 |
| A10 = | 5.8100E−01 | −4.2740E+00 | −5.4720E+00 | 4.4371E−01 | 4.8619E+00 |
| A12 = | −9.5771E−01 | 6.9840E+00 | 1.0109E+01 | −1.7608E+00 | −1.1621E+01 |
| A14 = | 8.5876E−01 | −5.9932E+00 | −9.3181E+00 | 3.2825E+00 | 1.3596E+01 |
| A16 = | −3.7769E−01 | 2.0643E+00 | 3.4171E+00 | −1.8451E+00 | −5.9068E+00 |

| Surface # | 8 | 9 | 10 | 11 | 12 |
|---|---|---|---|---|---|
| k = | 2.1160E+01 | −1.8476E+01 | −9.9000E+01 | −1.9783E+00 | −1.0000E+00 |
| A4 = | −1.7396E−01 | 1.7111E−02 | −4.9785E−02 | −4.9116E−01 | −3.7752E−01 |
| A6 = | −6.0233E−01 | −3.0874E−01 | −6.8494E−02 | 2.8466E−01 | 2.6761E−01 |
| A8 = | 3.2745E+00 | 6.8225E−01 | 2.6411E−01 | −7.5809E−02 | −1.5243E−01 |
| A10 = | −1.0019E+01 | −1.1170E+00 | −4.2627E−01 | 1.0196E−02 | 6.0005E−02 |
| A12 = | 1.8713E+01 | 1.0945E+00 | 3.3478E−01 | −8.6238E−04 | −1.5272E−02 |
| A14 = | −2.1358E+01 | −7.0920E−01 | −1.4277E−01 | 1.7630E−04 | 2.3902E−03 |
| A16 = | 1.4216E+01 | 3.0492E−01 | 3.4124E−02 | −4.1749E−05 | −2.1460E−04 |
| A18 = | −4.7717E+00 | −7.5719E−02 | −4.3141E−03 | 4.5650E−06 | 9.5999E−06 |
| A20 = | 5.4665E−01 | 7.9374E−03 | 2.2501E−04 | −1.8224E−07 | −1.4451E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

5th Embodiment

| | | | |
|---|---|---|---|
| f [mm] | 3.63 | TL/ImgH | 1.28 |
| Fno | 2.10 | (R1 + R2)/(R1 − R2) | −1.57 |
| HFOV [deg.] | 41.3 | R4/f | 1.39 |
| Nmax | 1.669 | R7/f | 0.98 |
| V2 | 19.5 | R10/ImgH | 0.43 |
| V2 + V3 + V4 | 94.3 | \|f/f3\| + \|f/f4\| | 0.25 |
| V2/N2 | 11.65 | f/f3 + f/f4 + f/f5 | −0.33 |
| V2/N2 + V3/N3 + V4/N4 | 59.47 | f/\|R5\| + f/\|R6\| | 0.56 |
| V3 | 37.4 | f/R9 | 1.24 |
| V4 | 37.4 | \|f2/f1\| | 2.74 |
| Vmin | 19.5 | \|f2/f5\| | 1.31 |
| ΣCT/ΣAT | 1.95 | \|f4/f5\| | 3.50 |
| CT1/T12 | 7.41 | f5/f | −1.71 |
| CT3/T34 | 0.81 | Y52/Y11 | 2.95 |
| CT4/T45 | 1.23 | Yc12/Y12 | 0.71 |
| CT5/CT4 | 1.93 | Yc41/Y41 | 0.52 |
| TL [mm] | 4.19 | Yc512/Yc511 | 4.11 |
| TL/f | 1.15 | Yc52/Y52 | 0.40 |

6th Embodiment

Figure 11:
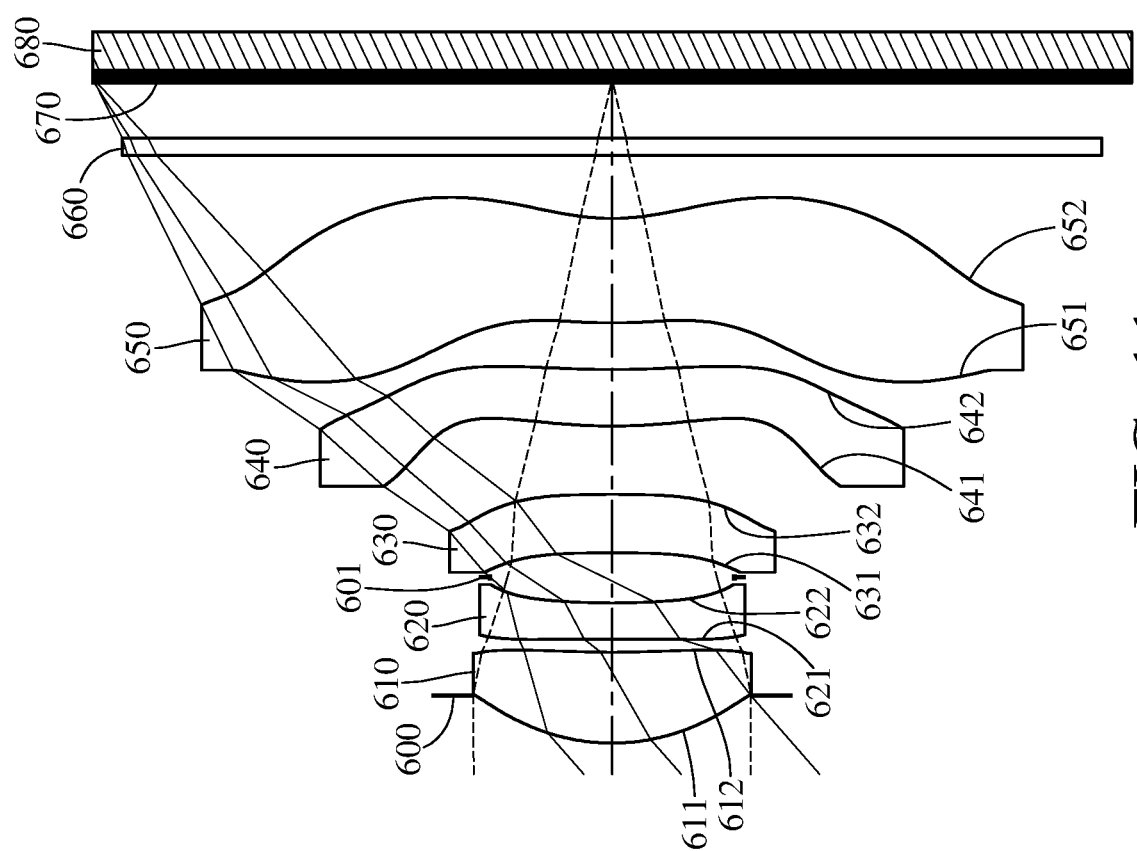
FIG. 11 is a schematic view of an image capturing unit according to the 6th embodiment of the present disclosure.
Figure 12:
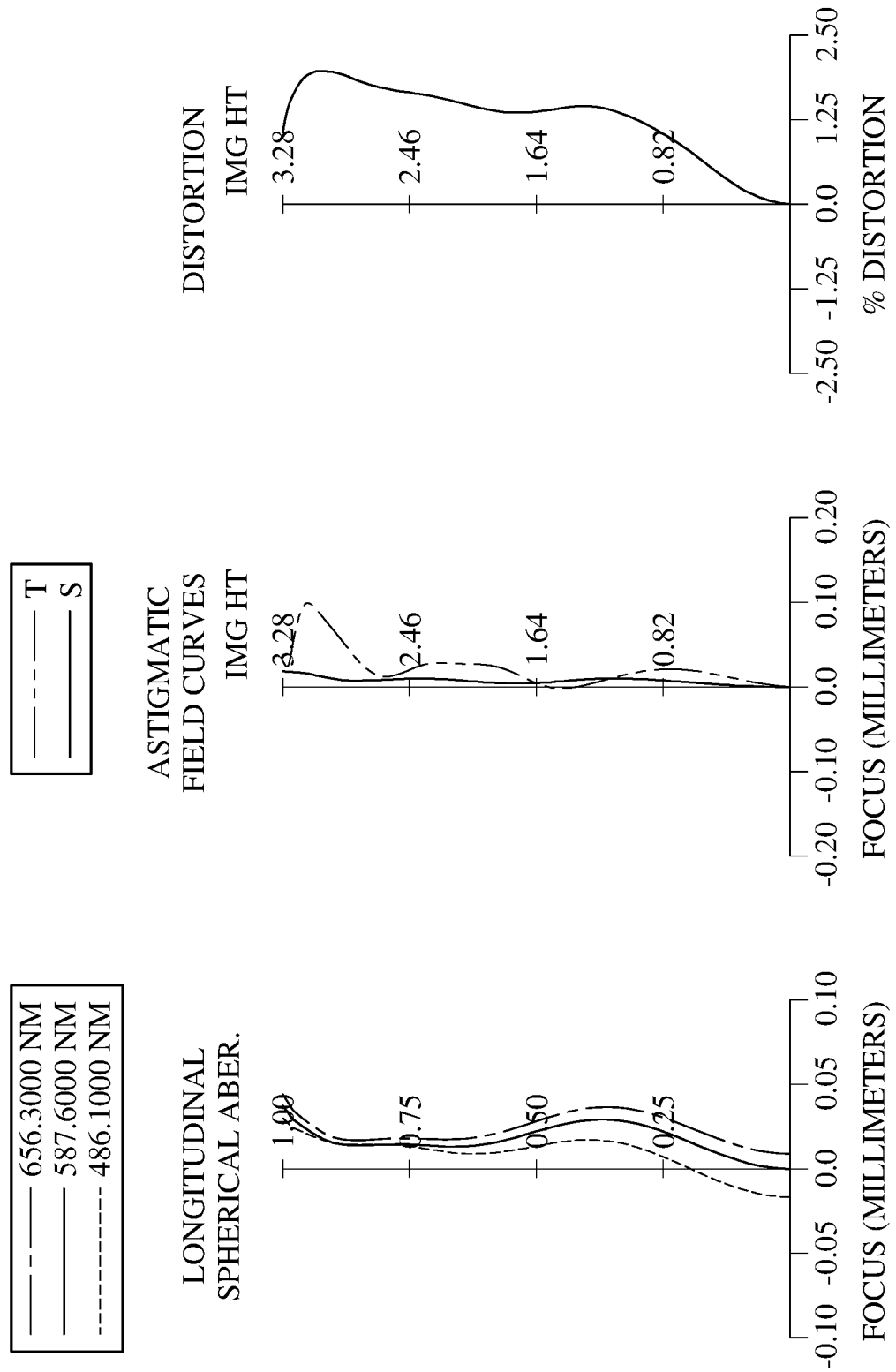
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens assembly (its reference numeral is omitted) of the present disclosure and an image sensor 680. The optical imaging lens assembly includes, in order from an object side to an image side, an aperture stop 600, a first lens element 610, a second lens element 620, a stop 601, a third lens element 630, a fourth lens element 640, a fifth lens element 650, a filter 660 and an image surface 670. The optical imaging lens assembly includes five lens elements (610, 620, 630, 640 and 650) with no additional lens element disposed between each of the adjacent five lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has one inflection point. The image-side surface 612 of the first lens element 610 has one critical point in an off-axis region thereof.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has two inflection points. The object-side surface 621 of the second lens element 620 has two critical points in an off-axis region thereof.

The third lens element 630 with positive refractive power has an object-side surface 631 being concave in a paraxial region thereof and an image-side surface 632 being convex in a paraxial region thereof. The third lens element 630 is made of plastic material and has the object-side surface 631 and the image-side surface 632 being both aspheric. The image-side surface 632 of the third lens element 630 has one inflection point.

The fourth lens element 640 with positive refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. The object-side surface 641 of the fourth lens element 640 has two inflection points. The image-side surface 642 of the fourth lens element 640 has three inflection points. The object-side surface 641 of the fourth lens element 640 has one critical point in an off-axis region thereof. The image-side surface 642 of the fourth lens element 640 has one critical point in an off-axis region thereof.

The fifth lens element 650 with negative refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The object-side surface 651 of the fifth lens element 650 has three inflection points. The image-side surface 652 of the fifth lens element 650 has three inflection points. The object-side surface 651 of the fifth lens element 650 has one concave critical point and one convex critical point in an off-axis region thereof. The image-side surface 652 of the fifth lens element 650 has one convex critical point in an off-axis region thereof.

The filter 660 is made of glass material and located between the fifth lens element 650 and the image surface 670, and will not affect the focal length of the optical imaging lens assembly. The image sensor 680 is disposed on or near the image surface 670 of the optical imaging lens assembly.

The detailed optical data of the 6th embodiment are shown in Table 11 and the aspheric surface data are shown in Table 12 below.

TABLE 11

6th Embodiment
f = 3.63 mm, Fno = 2.10, HFOV = 41.2 deg.

| Surface # |           | Curvature Radius |       | Thickness | Material | Index | Abbe # | Focal Length |
|-----------|-----------|------------------|-------|-----------|----------|-------|--------|--------------|
| 0         | Object    | Plano            |       | 350.000   |          |       |        |              |
| 1         | Ape. Stop | Plano            |       | −0.302    |          |       |        |              |
| 2         | Lens 1    | 1.314            | (ASP) | 0.577     | Plastic  | 1.545 | 56.1   | 2.92         |
| 3         |           | 6.390            | (ASP) | 0.083     |          |       |        |              |
| 4         | Lens 2    | 105.712          | (ASP) | 0.230     | Plastic  | 1.669 | 19.5   | −8.01        |
| 5         |           | 5.094            | (ASP) | 0.163     |          |       |        |              |
| 6         | Stop      | Plano            |       | 0.155     |          |       |        |              |
| 7         | Lens 3    | −15.422          | (ASP) | 0.371     | Plastic  | 1.566 | 37.4   | 82.12        |
| 8         |           | −11.681          | (ASP) | 0.434     |          |       |        |              |
| 9         | Lens 4    | 3.672            | (ASP) | 0.359     | Plastic  | 1.566 | 37.4   | 15.63        |
| 10        |           | 6.056            | (ASP) | 0.296     |          |       |        |              |
| 11        | Lens 5    | 3.064            | (ASP) | 0.663     | Plastic  | 1.534 | 55.9   | −5.68        |
| 12        |           | 1.409            | (ASP) | 0.400     |          |       |        |              |
| 13        | Filter    | Plano            |       | 0.110     | Glass    | 1.517 | 64.2   | —            |
| 14        |           | Plano            |       | 0.350     |          |       |        |              |
| 15        | Image     | Plano            |       | —         |          |       |        |              |

Note:
Reference wavelength is 587.6 nm (d-line).
An effective radius of the stop 601 (Surface 6) is 0.775 mm.

TABLE 12

Aspheric Coefficients

| Surface # | 2 | 3 | 4 | 5 | 7 |
|---|---|---|---|---|---|
| k =   | 1.1294E−01  | 7.2550E+00  | −9.9000E+01 | −1.7912E+01 | 7.2968E+01  |
| A4 =  | −2.4316E−02 | −1.2099E−01 | −1.1055E−01 | −9.7612E−03 | −2.7717E−01 |
| A6 =  | 5.2655E−02  | −2.0479E−01 | 9.1017E−02  | 4.8715E−01  | 3.9091E−01  |
| A8 =  | −1.6271E−01 | 1.6333E+00  | 1.6864E+00  | −1.0910E+00 | −2.6084E+00 |
| A10 = | 4.3240E−02  | −5.1104E+00 | −6.5524E+00 | 3.8316E+00  | 1.0150E+01  |
| A12 = | 2.2246E−01  | 8.5075E+00  | 1.2289E+01  | −8.6617E+00 | −2.2230E+01 |
| A14 = | −3.6411E−01 | −7.4923E+00 | −1.1619E+01 | 1.0674E+01  | 2.4984E+01  |
| A16 = | 1.0664E−01  | 2.6753E+00  | 4.3968E+00  | −5.1424E+00 | −1.0997E+01 |

| Surface # | 8 | 9 | 10 | 11 | 12 |
|---|---|---|---|---|---|
| k =   | 3.6843E+01  | −1.3694E+01 | −8.9189E+01 | −1.6770E+00 | −1.0000E+00 |
| A4 =  | −1.8938E−01 | 4.4886E−02  | −4.1167E−02 | −4.6980E−01 | −3.8416E−01 |
| A6 =  | −4.4450E−01 | −4.5434E−01 | −9.9426E−02 | 2.2658E−01  | 2.7072E−01  |
| A8 =  | 2.3227E+00  | 1.0694E+00  | 3.0088E−01  | −1.3632E−02 | −1.5569E−01 |
| A10 = | −6.9192E+00 | −1.7867E+00 | −4.5087E−01 | −2.5333E−02 | 6.3196E−02  |
| A12 = | 1.2820E+01  | 1.8450E+00  | 3.4631E−01  | 1.1204E−02  | −1.6954E−02 |
| A14 = | −1.4676E+01 | −1.2413E+00 | −1.4712E−01 | −2.3418E−03 | 2.8807E−03  |
| A16 = | 9.8746E+00  | 5.3309E−01  | 3.5336E−02  | 2.7529E−04  | −2.9445E−04 |
| A18 = | −3.3409E+00 | −1.2947E−01 | −4.5149E−03 | −1.7513E−05 | 1.6404E−05  |
| A20 = | 3.7548E−01  | 1.3260E−02  | 2.3898E−04  | 4.6940E−07  | −3.8102E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.63 | TL/ImgH | 1.28 |
| Fno | 2.10 | (R1 + R2)/(R1 − R2) | −1.52 |
| HFOV [deg.] | 41.2 | R4/f | 1.40 |
| Nmax | 1.669 | R7/f | 1.01 |
| V2 | 19.5 | R10/ImgH | 0.43 |
| V2 + V3 + V4 | 94.3 | \|f/f3\| + \|f/f4\| | 0.28 |
| V2/N2 | 11.65 | f/f3 + f/f4 + f/f5 | −0.36 |
| V2/N2 + V3/N3 + V4/N4 | 59.47 | f/\|R5\| + f/\|R6\| | 0.55 |
| V3 | 37.4 | f/R9 | 1.19 |
| V4 | 37.4 | \|f2/f1\| | 2.75 |
| Vmin | 19.5 | \|f2/f5\| | 1.41 |
| ΣCT/ΣAT | 1.95 | \|f4/f5\| | 2.75 |
| CT1/T12 | 6.95 | f5/f | −1.56 |
| CT3/T34 | 0.85 | Y52/Y11 | 2.95 |
| CT4/T45 | 1.21 | Yc12/Y12 | 0.70 |
| CT5/CT4 | 1.85 | Yc41/Y41 | 0.53 |
| TL [mm] | 4.19 | Yc512/Yc511 | 4.16 |
| TL/f | 1.15 | Yc52/Y52 | 0.39 |

7th Embodiment

Figure 13:
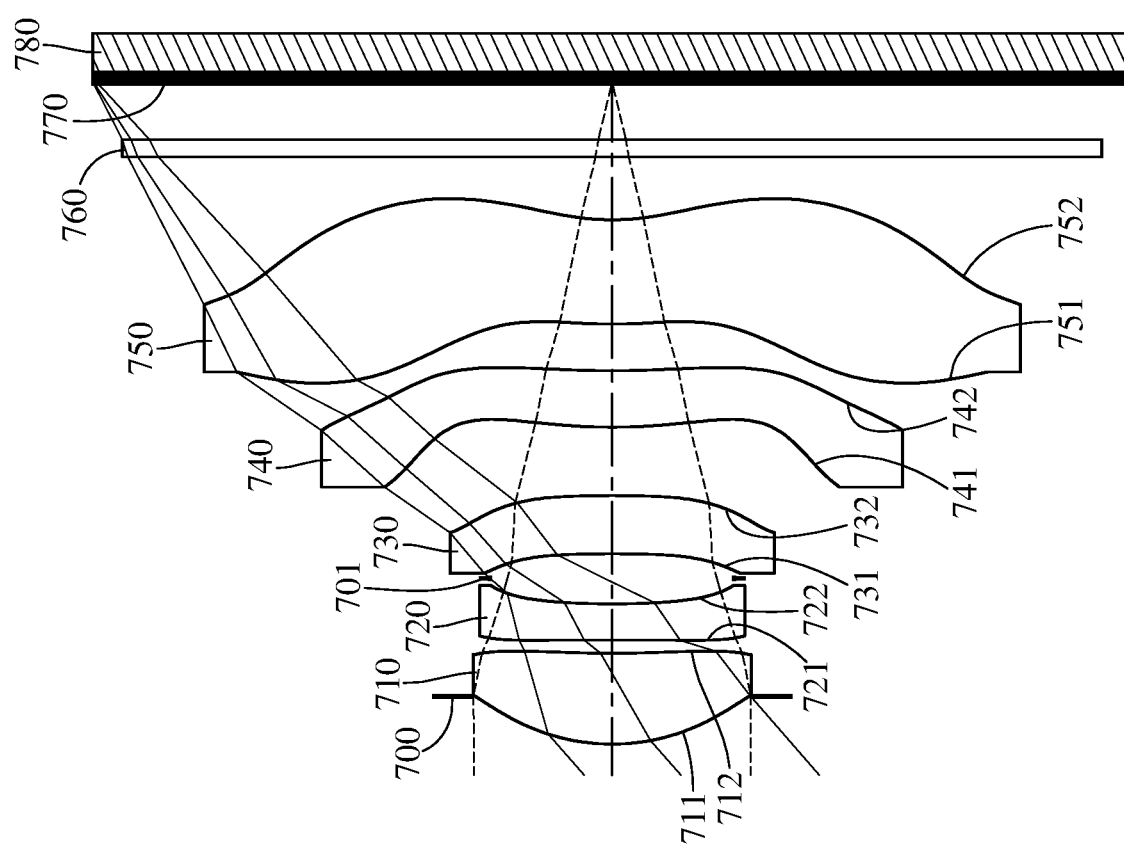
FIG. 13 is a schematic view of an image capturing unit according to the 7th embodiment of the present disclosure.
Figure 14:
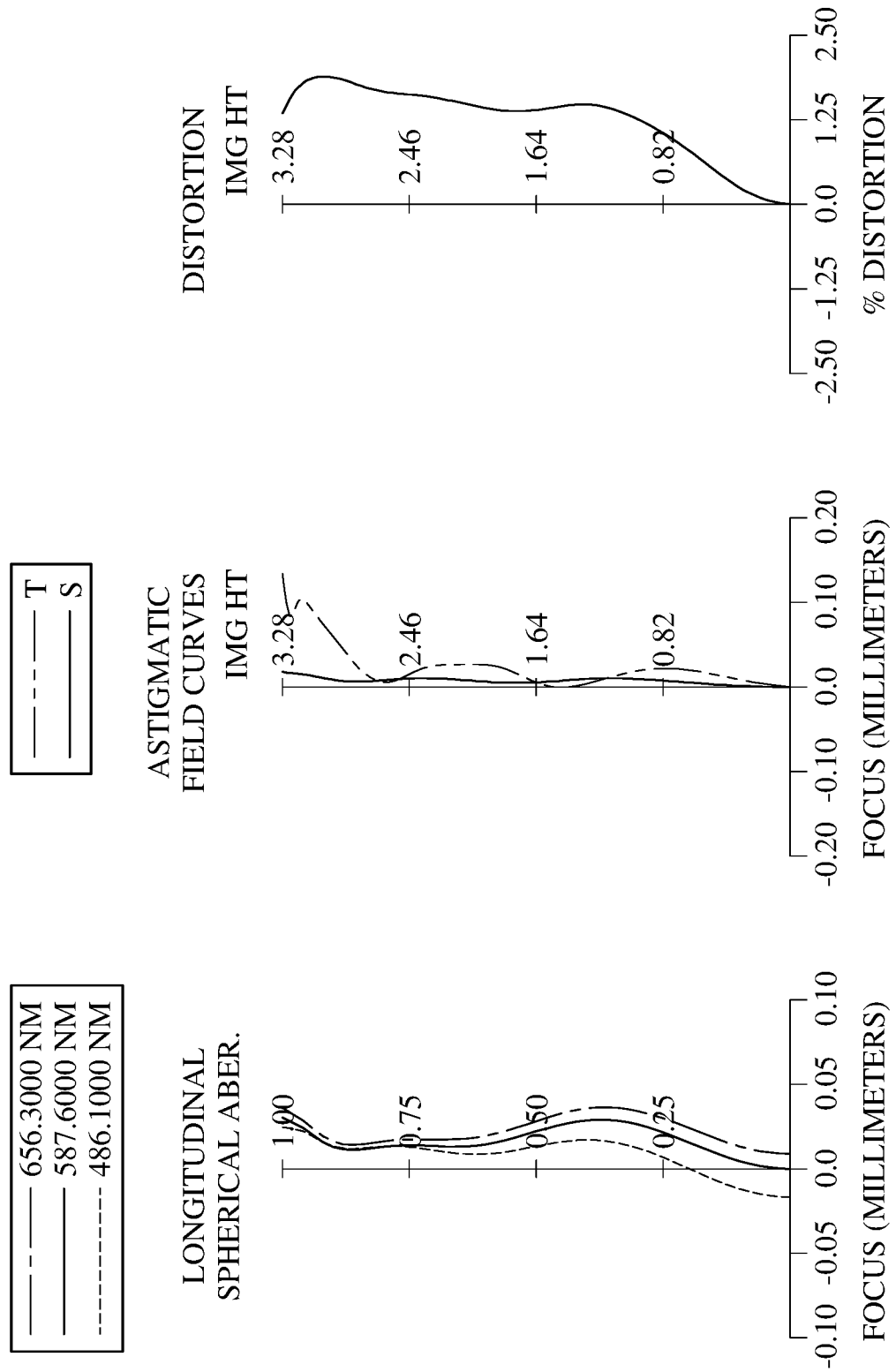
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens assembly (its reference numeral is omitted) of the present disclosure and an image sensor 780. The optical imaging lens assembly includes, in order from an object side to an image side, an aperture stop 700, a first lens element 710, a second lens element 720, a stop 701, a third lens element 730, a fourth lens element 740, a fifth lens element 750, a filter 760 and an image surface 770. The optical imaging lens assembly includes five lens elements (710, 720, 730, 740 and 750) with no additional lens element disposed between each of the adjacent five lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has one inflection point. The image-side surface 712 of the first lens element 710 has one critical point in an off-axis region thereof.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has two inflection points. The object-side surface 721 of the second lens element 720 has two critical points in an off-axis region thereof.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric. The image-side surface 732 of the third lens element 730 has one inflection point.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has two inflection points. The image-side surface 742 of the fourth lens element 740 has three inflection points. The object-side surface 741 of the fourth lens element 740 has one critical point in an off-axis region thereof. The image-side surface 742 of the fourth lens element 740 has one critical point in an off-axis region thereof.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The object-side surface 751 of the fifth lens element 750 has three inflection points. The image-side surface 752 of the fifth lens element 750 has three inflection points. The object-side surface 751 of the fifth lens element 750 has one concave critical point and one convex critical point in an off-axis region thereof. The image-side surface 752 of the fifth lens element 750 has one convex critical point in an off-axis region thereof.

The filter 760 is made of glass material and located between the fifth lens element 750 and the image surface 770, and will not affect the focal length of the optical imaging lens assembly. The image sensor 780 is disposed on or near the image surface 770 of the optical imaging lens assembly.

The detailed optical data of the 7th embodiment are shown in Table 13 and the aspheric surface data are shown in Table 14 below.

TABLE 13

7th Embodiment
f = 3.63 mm, Fno = 2.10, HFOV = 41.1 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Ape. Stop | Plano | | −0.303 | | | | |
| 2 | Lens 1 | 1.314 | (ASP) | 0.577 | Plastic | 1.545 | 56.1 | 2.92 |

TABLE 13-continued

7th Embodiment
f = 3.63 mm, Fno = 2.10, HFOV = 41.1 deg.

| Surface # | | Curvature Radius | | Thickness | Material | Index | Abbe # | Focal Length |
|---|---|---|---|---|---|---|---|---|
| 3 | | 6.398 | (ASP) | 0.084 | | | | |
| 4 | Lens 2 | 126.905 | (ASP) | 0.230 | Plastic | 1.669 | 19.5 | −7.98 |
| 5 | | 5.123 | (ASP) | 0.163 | | | | |
| 6 | Stop | Plano | | 0.155 | | | | |
| 7 | Lens 3 | −15.285 | (ASP) | 0.370 | Plastic | 1.566 | 37.4 | 76.11 |
| 8 | | −11.381 | (ASP) | 0.435 | | | | |
| 9 | Lens 4 | 3.689 | (ASP) | 0.359 | Plastic | 1.566 | 37.4 | 15.61 |
| 10 | | 6.110 | (ASP) | 0.296 | | | | |
| 11 | Lens 5 | 3.062 | (ASP) | 0.662 | Plastic | 1.534 | 55.9 | −5.67 |
| 12 | | 1.407 | (ASP) | 0.400 | | | | |
| 13 | Filter | Plano | | 0.110 | Glass | 1.517 | 64.2 | — |
| 14 | | Plano | | 0.350 | | | | |
| 15 | Image | Plano | | — | | | | |

Note:
Reference wavelength is 587.6 nm (d-line).
An effective radius of the stop 701 (Surface 6) is 0.775 mm.

TABLE 14

Aspheric Coefficients

| Surface # | 2 | 3 | 4 | 5 | 7 |
|---|---|---|---|---|---|
| k = | 1.1799E−01 | 8.2163E+00 | −9.9000E+01 | −1.6840E+01 | 3.6670E+01 |
| A4 = | −2.1887E−02 | −1.1608E−01 | −1.0218E−01 | 7.0889E−05 | −2.7424E−01 |
| A6 = | 2.5182E−02 | −2.2205E−01 | 4.5567E−02 | 3.7828E−01 | 3.4988E−01 |
| A8 = | −7.2359E−03 | 1.6978E+00 | 1.8908E+00 | −3.9049E−01 | −2.3451E+00 |
| A10 = | −4.2360E−01 | −5.3032E+00 | −7.1979E+00 | 1.2281E+00 | 9.2172E+00 |
| A12 = | 9.8687E−01 | 8.8423E+00 | 1.3479E+01 | −3.2033E+00 | −2.0392E+01 |
| A14 = | −1.0002E+00 | −7.8043E+00 | −1.2798E+01 | 4.6988E+00 | 2.3099E+01 |
| A16 = | 3.1665E−01 | 2.7928E+00 | 4.8710E+00 | −2.4997E+00 | −1.0199E+01 |

| Surface # | 8 | 9 | 10 | 11 | 12 |
|---|---|---|---|---|---|
| k = | 3.8047E+01 | −1.3880E+01 | −8.9999E+01 | −1.6733E+00 | −1.0000E+00 |
| A4 = | −1.9039E−01 | 4.3829E−02 | −4.4009E−02 | −4.7131E−01 | −3.8467E−01 |
| A6 = | −4.1807E−01 | −4.4633E−01 | −8.7332E−02 | 2.3008E−01 | 2.7160E−01 |
| A8 = | 2.1186E+00 | 1.0520E+00 | 2.7821E−01 | −1.6979E−02 | −1.5647E−01 |
| A10 = | −6.1244E+00 | −1.7713E+00 | −4.2727E−01 | −2.3580E−02 | 6.3640E−02 |
| A12 = | 1.1022E+01 | 1.8427E+00 | 3.3154E−01 | 1.0649E−02 | −1.7118E−02 |
| A14 = | −1.2225E+01 | −1.2473E+00 | −1.4144E−01 | −2.2329E−03 | 2.9180E−03 |
| A16 = | 7.8865E+00 | 5.3779E−01 | 3.4021E−02 | 2.6239E−04 | −2.9940E−04 |
| A18 = | −2.4540E+00 | −1.3087E−01 | −4.3468E−03 | −1.6672E−05 | 1.6753E−05 |
| A20 = | 2.0764E−01 | 1.3415E−02 | 2.2986E−04 | 4.4645E−07 | −3.9107E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

7th Embodiment

| f [mm] | 3.63 | TL/ImgH | 1.28 |
|---|---|---|---|
| Fno | 2.10 | (R1 + R2)/(R1 − R2) | −1.52 |
| HFOV [deg.] | 41.1 | R4/f | 1.41 |
| Nmax | 1.669 | R7/f | 1.02 |
| V2 | 19.5 | R10/ImgH | 0.43 |
| V2 + V3 + V4 | 94.3 | |f/f3| + |f/f4| | 0.28 |
| V2/N2 | 11.65 | f/f3 + f/f4 + f/f5 | −0.36 |

-continued

7th Embodiment

| V2/N2 + V3/N3 +V4/N4 | 59.47 | f/|R5| + f/|R6| | 0.56 |
|---|---|---|---|
| V3 | 37.4 | f/R9 | 1.19 |
| V4 | 37.4 | |f2/f1| | 2.74 |
| Vmin | 19.5 | |f2/f5| | 1.41 |
| ΣCT/ΣAT | 1.94 | |f4/f5| | 2.75 |
| CT1/T12 | 6.87 | f5/f | −1.56 |
| CT3/T34 | 0.85 | Y52/Y11 | 2.94 |
| CT4/T45 | 1.21 | Yc12/Y12 | 0.70 |
| CT5/CT4 | 1.84 | Yc41/Y41 | 0.53 |
| TL [mm] | 4.19 | Yc512/Yc511 | 4.16 |
| TL/f | 1.15 | Yc52/Y52 | 0.40 |

8th Embodiment

Figure 15:
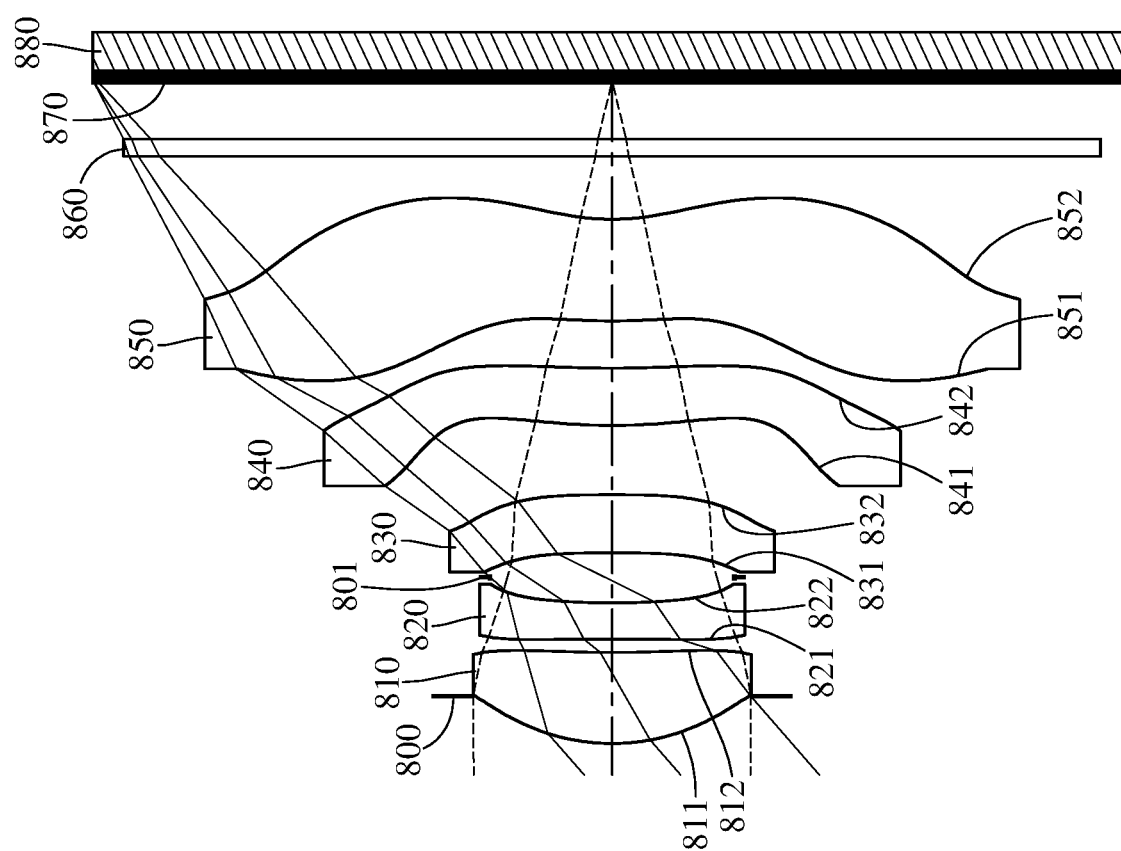
FIG. 15 is a schematic view of an image capturing unit according to the 8th embodiment of the present disclosure.
Figure 16:
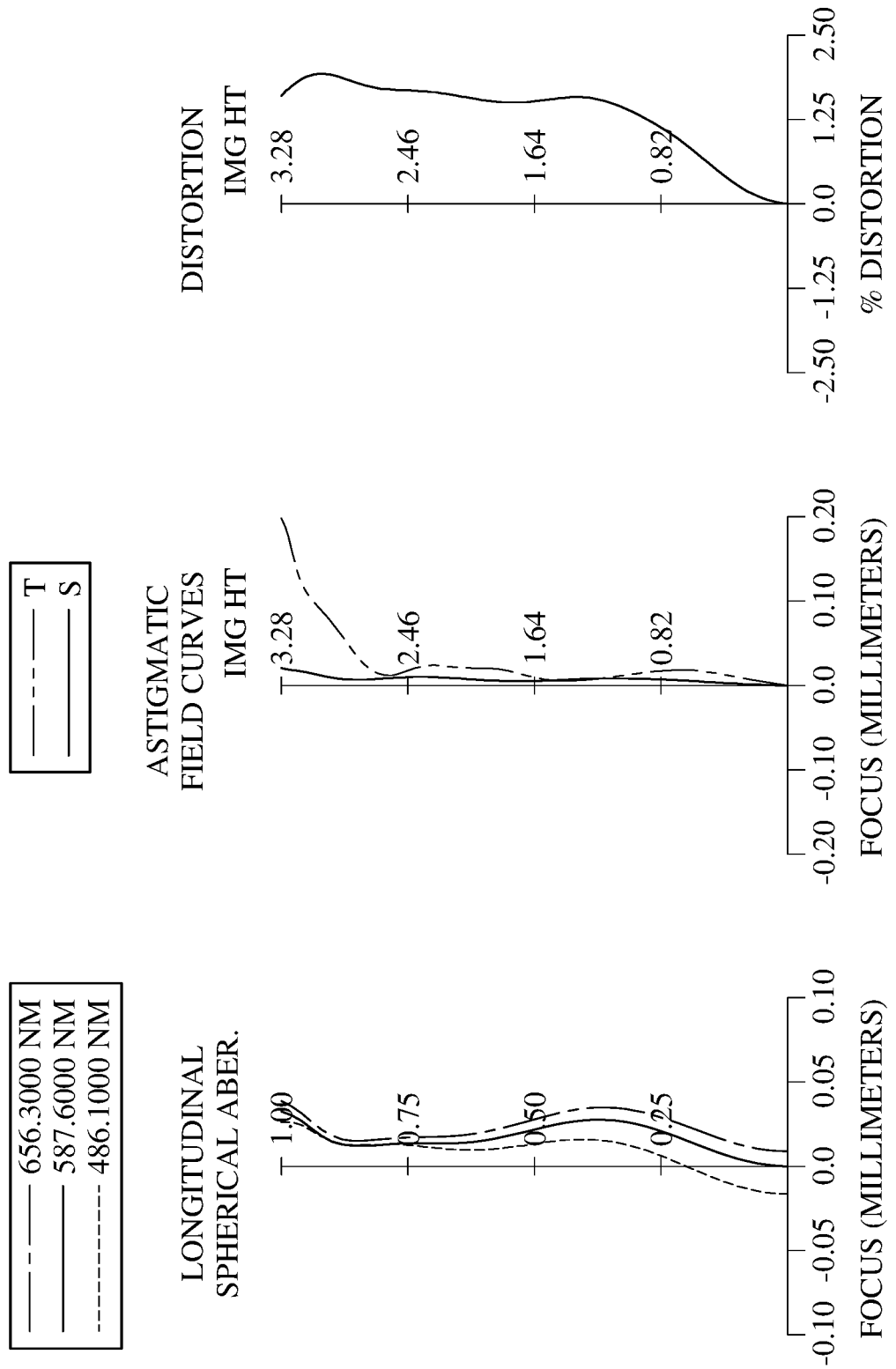
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens assembly (its reference numeral is omitted) of the present disclosure and an image sensor 880. The optical imaging lens assembly includes, in order from an object side to an image side, an aperture stop 800, a first lens element 810, a second lens element 820, a stop 801, a third lens element 830, a fourth lens element 840, a fifth lens element 850, a filter 860 and an image surface 870. The optical imaging lens assembly includes five lens elements (810, 820, 830, 840 and 850) with no additional lens element disposed between each of the adjacent five lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric. The object-side surface 811 of the first lens element 810 has one inflection point. The image-side surface 812 of the first lens element 810 has one critical point in an off-axis region thereof.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has two inflection points. The object-side surface 821 of the second lens element 820 has two critical points in an off-axis region thereof.

The third lens element 830 with positive refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric. The image-side surface 832 of the third lens element 830 has one inflection point.

The fourth lens element 840 with positive refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The object-side surface 841 of the fourth lens element 840 has two inflection points. The image-side surface 842 of the fourth lens element 840 has three inflection points. The object-side surface 841 of the fourth lens element 840 has one critical point in an off-axis region thereof. The image-side surface 842 of the fourth lens element 840 has one critical point in an off-axis region thereof.

The fifth lens element 850 with negative refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The object-side surface 851 of the fifth lens element 850 has three inflection points. The image-side surface 852 of the fifth lens element 850 has three inflection points. The object-side surface 851 of the fifth lens element 850 has one concave critical point and one convex critical point in an off-axis region thereof. The image-side surface 852 of the fifth lens element 850 has one convex critical point in an off-axis region thereof.

The filter 860 is made of glass material and located between the fifth lens element 850 and the image surface 870, and will not affect the focal length of the optical imaging lens assembly. The image sensor 880 is disposed on or near the image surface 870 of the optical imaging lens assembly.

The detailed optical data of the 8th embodiment are shown in Table 15 and the aspheric surface data are shown in Table 16 below.

TABLE 15

8th Embodiment
f = 3.63 mm, Fno = 2.10, HFOV = 41.1 deg.

| Surface # |  | Curvature Radius |  | Thickness | Material | Index | Abbe # | Focal Length |
|---|---|---|---|---|---|---|---|---|
| 0 | Object | Plano |  | 350.000 |  |  |  |  |
| 1 | Ape. Stop | Plano |  | −0.300 |  |  |  |  |
| 2 | Lens 1 | 1.317 | (ASP) | 0.578 | Plastic | 1.545 | 56.1 | 2.91 |
| 3 |  | 6.572 | (ASP) | 0.084 |  |  |  |  |
| 4 | Lens 2 | 110.524 | (ASP) | 0.231 | Plastic | 1.669 | 19.5 | −7.88 |
| 5 |  | 5.026 | (ASP) | 0.163 |  |  |  |  |
| 6 | Stop | Plano |  | 0.155 |  |  |  |  |
| 7 | Lens 3 | −16.019 | (ASP) | 0.369 | Plastic | 1.566 | 37.4 | 82.77 |
| 8 |  | −12.037 | (ASP) | 0.440 |  |  |  |  |
| 9 | Lens 4 | 3.868 | (ASP) | 0.364 | Plastic | 1.566 | 37.4 | 13.71 |
| 10 |  | 7.446 | (ASP) | 0.299 |  |  |  |  |
| 11 | Lens 5 | 3.134 | (ASP) | 0.646 | Plastic | 1.534 | 55.9 | −5.40 |
| 12 |  | 1.394 | (ASP) | 0.400 |  |  |  |  |
| 13 | Filter | Plano |  | 0.110 | Glass | 1.517 | 64.2 | — |
| 14 |  | Plano |  | 0.352 |  |  |  |  |
| 15 | Image | Plano |  | — |  |  |  |  |

Note:
Reference wavelength is 587.6 nm (d-line).
An effective radius of the stop 801 (Surface 6) is 0.775 mm.

TABLE 16

Aspheric Coefficients

| Surface # | 2 | 3 | 4 | 5 | 7 |
|---|---|---|---|---|---|
| k = | −9.6590E−02 | 1.0907E+01 | 9.6462E+01 | −1.6875E+01 | 9.9000E+01 |
| A4 = | −1.2079E−02 | −1.2199E−01 | −1.1045E−01 | −6.9775E−03 | −2.7128E−01 |
| A6 = | 5.0041E−02 | −2.0155E−01 | 1.3363E−01 | 4.6091E−01 | 2.8499E−01 |
| A8 = | −1.4648E−01 | 1.6217E+00 | 1.4066E+00 | −8.7789E−01 | −1.9060E+00 |
| A10 = | 9.2150E−02 | −5.0937E+00 | −5.6520E+00 | 2.8672E+00 | 7.8240E+00 |
| A12 = | 2.4061E−02 | 8.4118E+00 | 1.0654E+01 | −6.3912E+00 | −1.8040E+01 |
| A14 = | −1.0582E−01 | −7.2880E+00 | −1.0040E+01 | 8.0849E+00 | 2.1096E+01 |
| A16 = | −6.9730E−03 | 2.5426E+00 | 3.7567E+00 | −4.0225E+00 | −9.4989E+00 |
| Surface # | 8 | 9 | 10 | 11 | 12 |
| k = | 3.8335E+01 | −1.1516E+01 | −9.6087E+01 | −1.6185E+00 | −1.0001E+00 |
| A4 = | −1.9361E−01 | 3.7036E−02 | −4.1970E−02 | −4.6586E−01 | −3.9019E−01 |
| A6 = | −4.2652E−01 | −4.0542E−01 | −9.3767E−02 | 2.2428E−01 | 2.7896E−01 |
| A8 = | 2.3124E+00 | 9.0564E−01 | 2.9072E−01 | −1.2614E−02 | −1.6274E−01 |
| A10 = | −7.1301E+00 | −1.4907E+00 | −4.4200E−01 | −2.6219E−02 | 6.7029E−02 |
| A12 = | 1.3704E+01 | 1.5288E+00 | 3.4185E−01 | 1.1718E−02 | −1.8263E−02 |
| A14 = | −1.6361E+01 | −1.0355E+00 | −1.4588E−01 | −2.4980E−03 | 3.1566E−03 |
| A16 = | 1.1612E+01 | 4.5276E−01 | 3.5181E−02 | 3.0096E−04 | −3.2907E−04 |
| A18 = | −4.2681E+00 | −1.1214E−01 | −4.5140E−03 | −1.9701E−05 | 1.8767E−05 |
| A20 = | 5.7467E−01 | 1.1672E−02 | 2.4003E−04 | 5.4571E−07 | −4.4850E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.63 | TL/ImgH | 1.28 |
| Fno | 2.10 | (R1 + R2)/(R1 − R2) | −1.50 |
| HFOV [deg.] | 41.1 | R4/f | 1.38 |
| Nmax | 1.669 | R7/f | 1.06 |
| V2 | 19.5 | R10/ImgH | 0.42 |
| V2 + V3 + V4 | 94.3 | |f/f3| + |f/f4| | 0.31 |
| V2/N2 | 11.65 | f/f3 + f/f4 + f/f5 | −0.36 |
| V2/N2 + V3/N3 + V4/N4 | 59.47 | f/|R5| + f/|R6| | 0.53 |
| V3 | 37.4 | f/R9 | 1.16 |
| V4 | 37.4 | |f2/f1| | 2.71 |
| Vmin | 19.5 | |f2/f5| | 1.46 |
| ΣCT/ΣAT | 1.92 | |f4/f5| | 2.54 |
| CT1/T12 | 6.88 | f5/f | −1.49 |
| CT3/T34 | 0.84 | Y52/Y11 | 2.93 |
| CT4/T45 | 1.22 | Yc12/Y12 | 0.68 |
| CT5/CT4 | 1.77 | Yc41/Y41 | 0.53 |
| TL [mm] | 4.19 | Yc512/Yc511 | 4.20 |
| TL/f | 1.15 | Yc52/Y52 | 0.40 |

9th Embodiment

Figure 17:
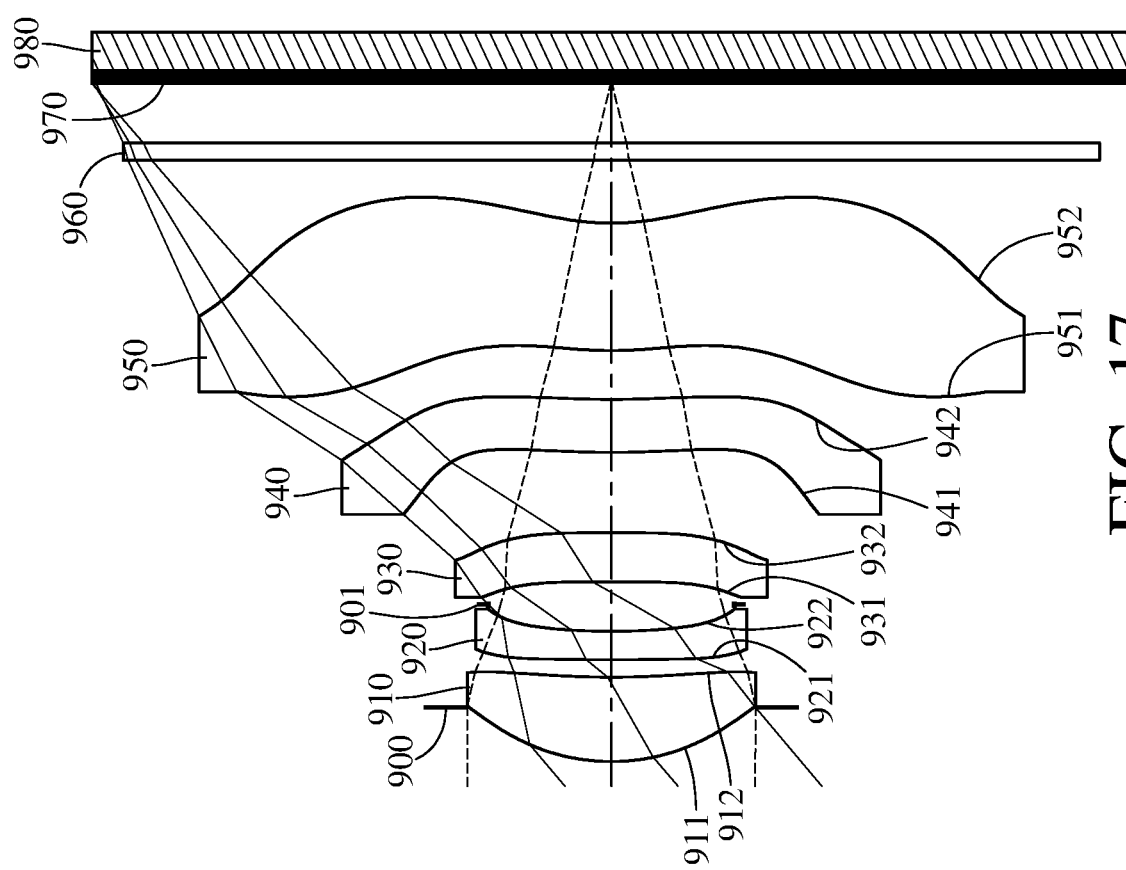
FIG. 17 is a schematic view of an image capturing unit according to the 9th embodiment of the present disclosure.
Figure 18:
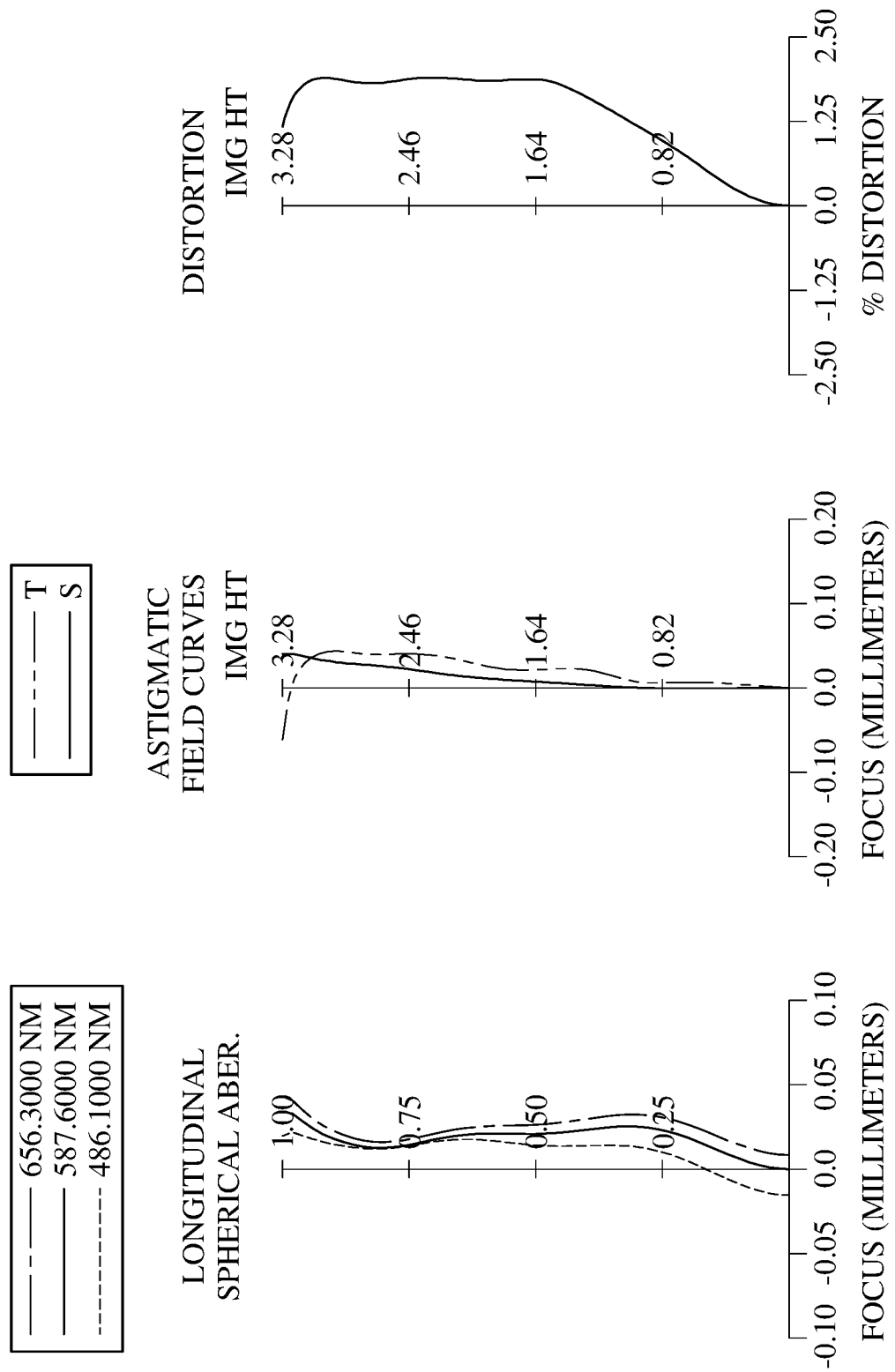
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens assembly (its reference numeral is omitted) of the present disclosure and an image sensor 980. The optical imaging lens assembly includes, in order from an object side to an image side, an aperture stop 900, a first lens element 910, a second lens element 920, a stop 901, a third lens element 930, a fourth lens element 940, a fifth lens element 950, a filter 960 and an image surface 970. The optical imaging lens assembly includes five lens elements (910, 920, 930, 940 and 950) with no additional lens element disposed between each of the adjacent five lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric. The object-side surface 911 of the first lens element 910 has one inflection point. The image-side surface 912 of the first lens element 910 has one critical point in an off-axis region thereof.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric. The object-side surface 931 of the third lens element 930 has two inflection points. The image-side surface 932 of the third lens element 930 has one inflection point. The object-side surface 931 of the third lens element 930 has one critical point in an off-axis region thereof.

The fourth lens element 940 with negative refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric. The object-side surface 941 of the fourth lens element 940 has two inflection points. The image-side surface 942 of the fourth lens element 940 has three inflection points. The object-side surface 941 of the fourth lens element 940 has one critical point in an off-axis region thereof. The image-side surface 942 of the fourth lens element 940 has one critical point in an off-axis region thereof.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The object-side surface 951 of the fifth lens element 950 has two inflection points. The image-side surface 952 of the fifth lens element 950 has two inflection points. The object-side surface 951 of the fifth lens element 950 has one concave critical point and one convex critical point in an off-axis region thereof. The image-side surface 952 of the fifth lens element 950 has one convex critical point in an off-axis region thereof.

The filter 960 is made of glass material and located between the fifth lens element 950 and the image surface 970, and will not affect the focal length of the optical imaging lens assembly. The image sensor 980 is disposed on or near the image surface 970 of the optical imaging lens assembly.

The detailed optical data of the 9th embodiment are shown in Table 17 and the aspheric surface data are shown in Table 18 below.

TABLE 17

9th Embodiment
f = 3.77 mm, Fno = 2.10, HFOV = 40.1 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Ape. Stop | Plano | | −0.344 | | | | |
| 2 | Lens 1 | 1.293 | (ASP) | 0.535 | Plastic | 1.545 | 56.1 | 3.06 |
| 3 | | 4.923 | (ASP) | 0.111 | | | | |
| 4 | Lens 2 | 13.584 | (ASP) | 0.180 | Plastic | 1.686 | 18.4 | −8.39 |
| 5 | | 4.020 | (ASP) | 0.171 | | | | |
| 6 | Stop | Plano | | 0.143 | | | | |
| 7 | Lens 3 | 186.220 | (ASP) | 0.312 | Plastic | 1.614 | 26.0 | 40.81 |
| 8 | | −28.921 | (ASP) | 0.509 | | | | |
| 9 | Lens 4 | 5.723 | (ASP) | 0.336 | Plastic | 1.614 | 26.0 | −91.34 |
| 10 | | 5.077 | (ASP) | 0.310 | | | | |
| 11 | Lens 5 | 2.423 | (ASP) | 0.808 | Plastic | 1.534 | 55.9 | −11.87 |
| 12 | | 1.549 | (ASP) | 0.400 | | | | |
| 13 | Filter | Plano | | 0.110 | Glass | 1.517 | 64.2 | — |
| 14 | | Plano | | 0.378 | | | | |
| 15 | Image | Plano | | — | | | | |

Note:
Reference wavelength is 587.6 nm (d-line).
An effective radius of the stop 901 (Surface 6) is 0.780 mm.

TABLE 18

Aspheric Coefficients

| Surface # | 2 | 3 | 4 | 5 | 7 |
|---|---|---|---|---|---|
| k = | 1.6285E−01 | 1.7473E+01 | 9.0679E+01 | −1.6490E+01 | 9.9000E+01 |
| A4 = | −2.8725E−02 | −1.2762E−01 | −1.6512E−01 | −3.0215E−02 | −2.4172E−01 |
| A6 = | 1.3024E−01 | 7.3749E−02 | 5.4311E−01 | 2.7336E−01 | −1.7823E−02 |
| A8 = | −6.3980E−01 | −1.2671E−02 | −5.7836E−01 | 1.2999E+00 | 4.2694E−01 |
| A10 = | 1.5743E+00 | 7.2644E−02 | 8.9022E−01 | −5.9629E+00 | −2.1405E+00 |
| A12 = | −2.3324E+00 | −4.2880E−01 | −1.5631E+00 | 1.2728E+01 | 5.2062E+00 |
| A14 = | 1.8246E+00 | 4.9417E−01 | 1.7184E+00 | −1.3506E+01 | −6.4841E+00 |
| A16 = | −6.3497E−01 | −2.2101E−01 | −7.5484E−01 | 6.1032E+00 | 3.4595E+00 |

| Surface # | 8 | 9 | 10 | 11 | 12 |
|---|---|---|---|---|---|
| k = | −9.9000E+01 | −2.9133E+01 | −9.9000E+01 | −2.9808E+00 | −1.0972E+00 |
| A4 = | −2.2498E−01 | −1.1761E−01 | −1.8321E−01 | −4.0794E−01 | −2.6857E−01 |
| A6 = | 2.1815E−01 | 3.1278E−01 | 4.5455E−01 | 3.3480E−01 | 1.5734E−01 |
| A8 = | −1.4974E+00 | −9.7602E−01 | −7.9211E−01 | −2.0536E−01 | −7.1926E−02 |
| A10 = | 6.2393E+00 | 1.5543E+00 | 8.1569E−01 | 9.2379E−02 | 2.1422E−02 |
| A12 = | −1.6294E+01 | −1.6873E+00 | −5.6028E−01 | −2.7920E−02 | −3.7993E−03 |
| A14 = | 2.6879E+01 | 1.2118E+00 | 2.5576E−01 | 5.4467E−03 | 3.3483E−04 |
| A16 = | −2.7012E+01 | −5.6199E−01 | −7.2683E−02 | −6.5766E−04 | −3.1780E−06 |
| A18 = | 1.5101E+01 | 1.5704E−01 | 1.1484E−02 | 4.4763E−05 | −1.5783E−06 |
| A20 = | −3.5697E+00 | −1.9948E−02 | −7.6697E−04 | −1.3153E−06 | 7.9179E−08 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 3.77 | TL/ImgH | 1.31 |
| Fno | 2.10 | (R1 + R2)/(R1 − R2) | −1.71 |
| HFOV [deg.] | 40.1 | R4/f | 1.07 |
| Nmax | 1.686 | R7/f | 1.52 |
| V2 | 18.4 | R10/ImgH | 0.47 |
| V2 + V3 + V4 | 70.3 | |f/f3| + |f/f4| | 0.13 |
| V2/N2 | 10.90 | f/f3 + f/f4 + f/f5 | −0.27 |
| V2/N2 + V3/N3 + V4/N4 | 43.09 | f/|R5| + f/|R6| | 0.15 |
| V3 | 26.0 | f/R9 | 1.55 |
| V4 | 26.0 | |f2/f1| | 2.74 |
| Vmin | 18.4 | |f2/f5| | 0.71 |
| ΣCT/ΣAT | 1.75 | |f4/f5| | 7.69 |
| CT1/T12 | 4.82 | f5/f | −3.15 |
| CT3/T34 | 0.61 | Y52/Y11 | 2.86 |
| CT4/T45 | 1.08 | Yc12/Y12 | 0.90 |
| CT5/CT4 | 2.40 | Yc41/Y41 | 0.49 |
| TL [mm] | 4.30 | Yc512/Yc511 | 3.41 |
| TL/f | 1.14 | Yc52/Y52 | 0.46 |

10th Embodiment

Figure 19:
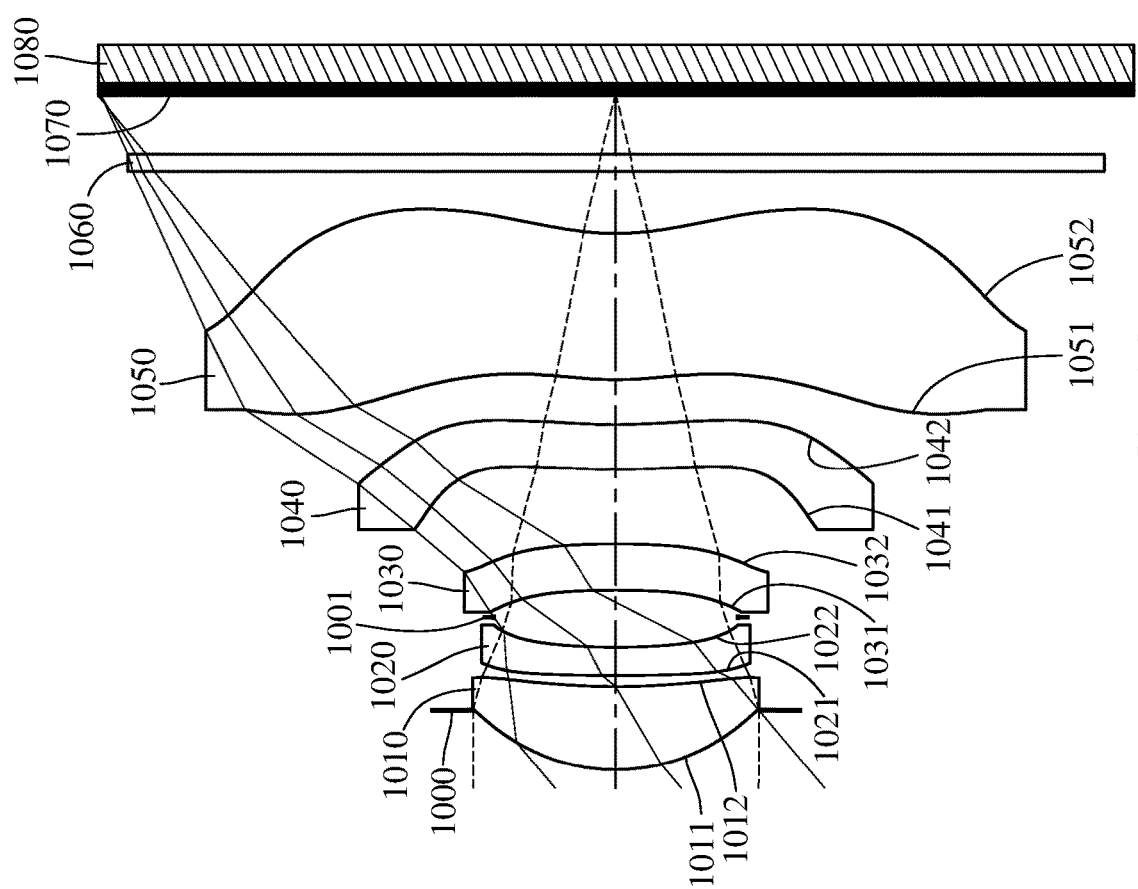
FIG. 19 is a schematic view of an image capturing unit according to the 10th embodiment of the present disclosure.
Figure 20:
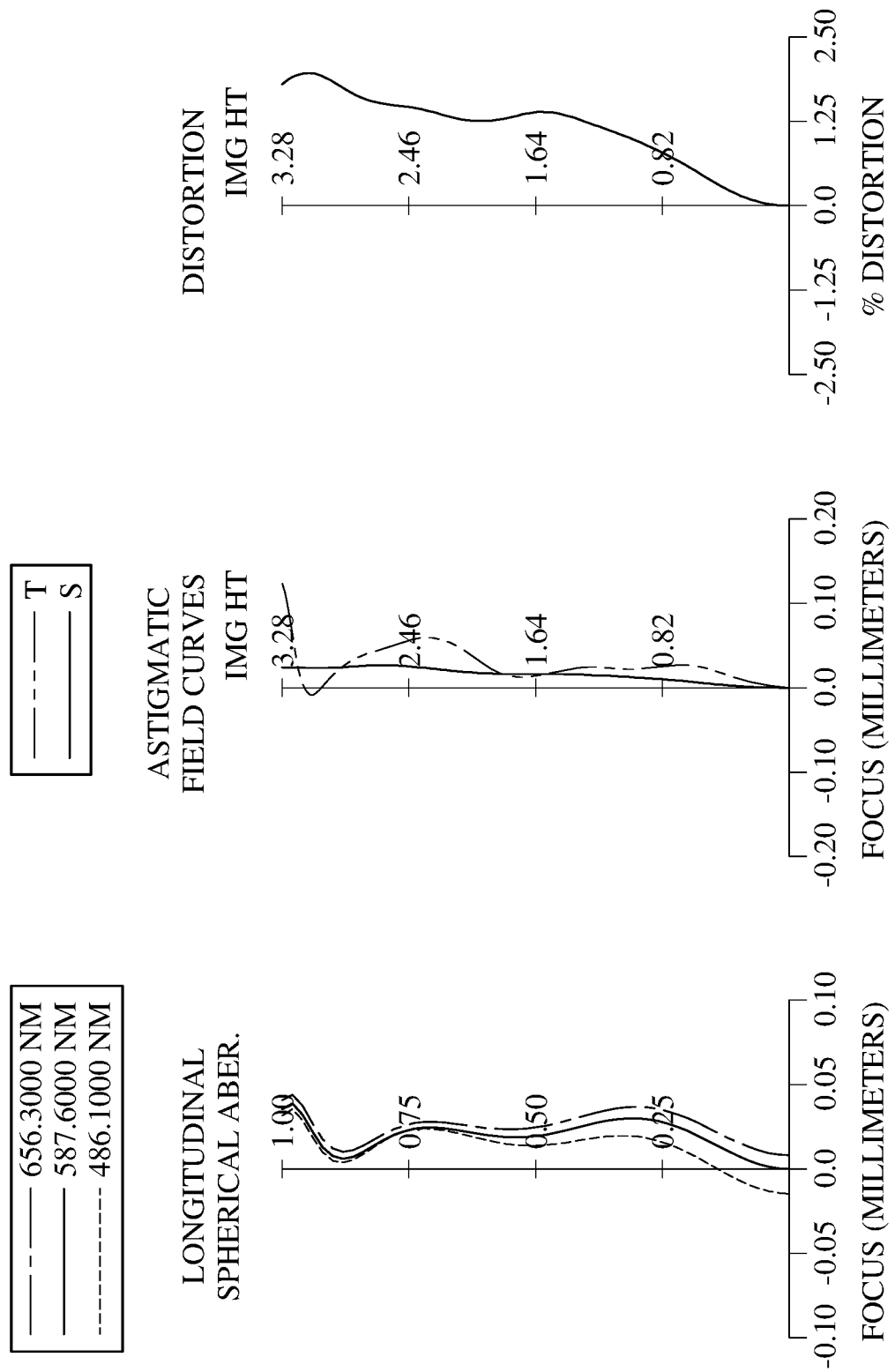
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical imaging lens assembly (its reference numeral is omitted) of the present disclosure and an image sensor 1080. The optical imaging lens assembly includes, in order from an object side to an image side, an aperture stop 1000, a first lens element 1010, a second lens element 1020, a stop 1001, a third lens element 1030, a fourth lens element 1040, a fifth lens element 1050, a filter 1060 and an image surface 1070. The optical imaging lens assembly includes five lens elements (1010, 1020, 1030, 1040 and 1050) with no additional lens element disposed between each of the adjacent five lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. The object-side surface 1011 of the first lens element 1010 has one inflection point. The image-side surface 1012 of the first lens element 1010 has one inflection point. The image-side surface 1012 of the first lens element 1010 has one critical point in an off-axis region thereof.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with negative refractive power has an object-side surface 1031 being concave in a paraxial region thereof and an image-side surface 1032 being convex in a paraxial region thereof. The third lens element 1030 is made of plastic material and has the object-side surface 1031 and the image-side surface 1032 being both aspheric. The image-side surface 1032 of the third lens element 1030 has one inflection point.

The fourth lens element 1040 with negative refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric. The object-side surface 1041 of the fourth lens element 1040 has two inflection points. The image-side surface 1042 of the fourth lens element 1040 has one inflection point. The object-side surface 1041 of the fourth lens element 1040 has one critical point in an off-axis region thereof. The image-side surface 1042 of the fourth lens element 1040 has one critical point in an off-axis region thereof.

The fifth lens element 1050 with negative refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric. The object-side surface 1051 of the fifth lens element 1050 has two inflection points. The image-side surface 1052 of the fifth lens element 1050 has two inflection points. The object-side surface 1051 of the fifth lens element 1050 has one concave critical point and one convex critical point in an off-axis region thereof. The image-side surface 1052 of the fifth lens element 1050 has one convex critical point in an off-axis region thereof.

The filter 1060 is made of glass material and located between the fifth lens element 1050 and the image surface 1070, and will not affect the focal length of the optical imaging lens assembly. The image sensor 1080 is disposed on or near the image surface 1070 of the optical imaging lens assembly.

The detailed optical data of the 9th embodiment are shown in Table 19 and the aspheric surface data are shown in Table 20 below.

TABLE 19

10th Embodiment
f = 3.76 mm, Fno = 2.10, HFOV = 40.0 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Ape. Stop | Plano | | −0.382 | | | | |
| 2 | Lens 1 | 1.244 | (ASP) | 0.533 | Plastic | 1.545 | 56.1 | 3.06 |

TABLE 19-continued

10th Embodiment
f = 3.76 mm, Fno = 2.10, HFOV = 40.0 deg.

| Surface # | | Curvature Radius | | Thickness | Material | Index | Abbe # | Focal Length |
|---|---|---|---|---|---|---|---|---|
| 3 | | 4.165 | (ASP) | 0.070 | | | | |
| 4 | Lens 2 | 9.273 | (ASP) | 0.180 | Plastic | 1.679 | 18.4 | −11.84 |
| 5 | | 4.273 | (ASP) | 0.192 | | | | |
| 6 | Stop | Plano | | 0.171 | | | | |
| 7 | Lens 3 | −6.814 | (ASP) | 0.294 | Plastic | 1.679 | 18.4 | −236.47 |
| 8 | | −7.240 | (ASP) | 0.478 | | | | |
| 9 | Lens 4 | 4.939 | (ASP) | 0.288 | Plastic | 1.679 | 18.4 | −18.50 |
| 10 | | 3.462 | (ASP) | 0.287 | | | | |
| 11 | Lens 5 | 2.292 | (ASP) | 0.930 | Plastic | 1.534 | 55.9 | −28.94 |
| 12 | | 1.714 | (ASP) | 0.400 | | | | |
| 13 | Filter | Plano | | 0.110 | Glass | 1.517 | 64.2 | — |
| 14 | | Plano | | 0.372 | | | | |
| 15 | Image | Plano | | — | | | | |

Note:
Reference wavelength is 587.6 nm (d-line).
An effective radius of the stop 1001 (Surface 6) is 0.780 mm.

TABLE 20

Aspheric Coefficients

| Surface # | 2 | 3 | 4 | 5 | 7 |
|---|---|---|---|---|---|
| k = | 2.1373E−01 | 1.3589E+01 | 7.2382E+01 | −1.2945E+01 | −2.3402E+01 |
| A4 = | −3.4270E−02 | −1.4565E−01 | −1.4115E−01 | −6.6339E−03 | −2.9104E−01 |
| A6 = | 1.9688E−01 | 2.7161E−01 | 4.7794E−01 | 5.3065E−01 | 1.0163E+00 |
| A8 = | −9.0994E−01 | −6.7397E−01 | −4.3805E−01 | −1.4021E+00 | −7.4920E+00 |
| A10 = | 2.3767E+00 | 1.3410E+00 | −2.0002E−01 | 4.6302E+00 | 2.9041E+01 |
| A12 = | −3.7398E+00 | −1.2523E+00 | 1.9935E+00 | −9.6283E+00 | −6.2175E+01 |
| A14 = | 3.2287E+00 | −1.5081E−02 | −3.0536E+00 | 1.1322E+01 | 6.9087E+01 |
| A16 = | −1.2330E+00 | 3.2708E−01 | 1.5015E+00 | −5.0544E+00 | −3.0855E+01 |

| Surface # | 8 | 9 | 10 | 11 | 12 |
|---|---|---|---|---|---|
| k = | −8.7782E+01 | −3.4761E+01 | −7.3661E+01 | −3.3695E+00 | −1.1545E+00 |
| A4 = | −2.4987E−01 | −1.9473E−01 | −1.8990E−01 | −4.1502E−01 | −2.2481E−01 |
| A6 = | 2.6350E−01 | 5.9582E−01 | 4.3754E−01 | 3.8315E−01 | 1.1806E−01 |
| A8 = | −7.1521E−01 | −1.7981E+00 | −6.5777E−01 | −2.3415E−01 | −4.6137E−02 |
| A10 = | 1.4596E−01 | 3.3876E+00 | 5.3423E−01 | 9.5093E−02 | 1.0146E−02 |
| A12 = | 4.0408E+00 | −4.5164E+00 | −2.6806E−01 | −2.5115E−02 | −6.4218E−04 |
| A14 = | −9.8270E+00 | 3.9669E+00 | 8.5084E−02 | 4.2559E−03 | −2.1794E−04 |
| A16 = | 1.0202E+01 | −2.1444E+00 | −1.5870E−02 | −4.4653E−04 | 5.4699E−05 |
| A18 = | −4.6348E+00 | 6.4116E−01 | 1.4145E−03 | 2.6435E−05 | −4.8574E−06 |
| A20 = | 6.4236E−01 | −8.0290E−02 | −2.8040E−05 | −6.7625E−07 | 1.5568E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 3.76 | TL/ImgH | 1.31 |
| Fno | 2.10 | (R1 + R2)/(R1 − R2) | −1.85 |
| HFOV [deg.] | 40.0 | R4/f | 1.14 |
| Nmax | 1.679 | R7/f | 1.31 |
| V2 | 18.4 | R10/ImgH | 0.52 |
| V2 + V3 + V4 | 55.3 | |f/f3| + |f/f4| | 0.22 |
| V2/N2 | 10.98 | f/f3 + f/f4 + f/f5 | −0.35 |

-continued

| 10th Embodiment | | | |
|---|---|---|---|
| V2/N2 + V3/N3 + V4/N4 | 32.95 | f/|R5| + f/|R6| | 1.07 |
| V3 | 18.4 | f/R9 | 1.64 |
| V4 | 18.4 | |f2/f1| | 3.87 |
| Vmin | 18.4 | |f2/f5| | 0.41 |
| ΣCT/ΣT | 1.86 | |f4/f5| | 0.64 |
| CT1/T12 | 7.61 | f5/f | −7.69 |
| CT3/T34 | 0.62 | Y52/Y11 | 2.86 |
| CT4/T45 | 1.00 | Yc12/Y12 | 0.95 |
| CT5/CT4 | 3.23 | Yc41/Y41 | 0.49 |
| TL [mm] | 4.31 | Yc512/Yc511 | 3.23 |
| TL/f | 1.14 | Yc52/Y52 | 0.46 |

11th Embodiment

Figure 21:
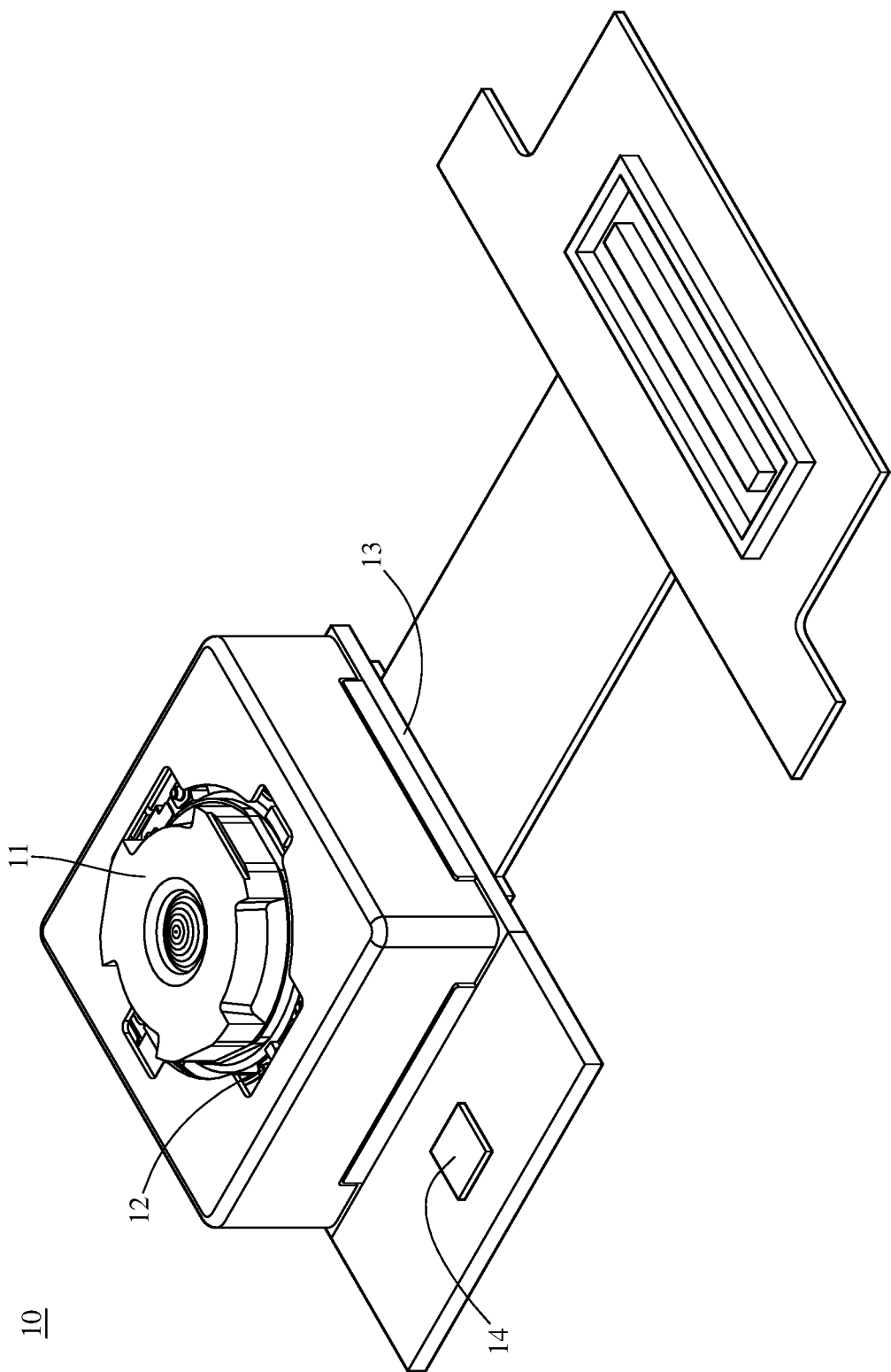
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 10 is a camera module including a lens unit 11, a driving device 12, an image sensor 13 and an image stabilizer 14. The lens unit 11 includes the optical imaging lens assembly disclosed in the 1st embodiment, a barrel and a holder member (their reference numerals are omitted) for holding the optical imaging lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical imaging lens assembly to provide higher image quality.

The image stabilizer 14, such as an accelerometer, a gyro sensor and a Hall Effect sensor, is configured to work with the driving device 12 to provide optical image stabilization (01S). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

12th Embodiment

Figure 22:
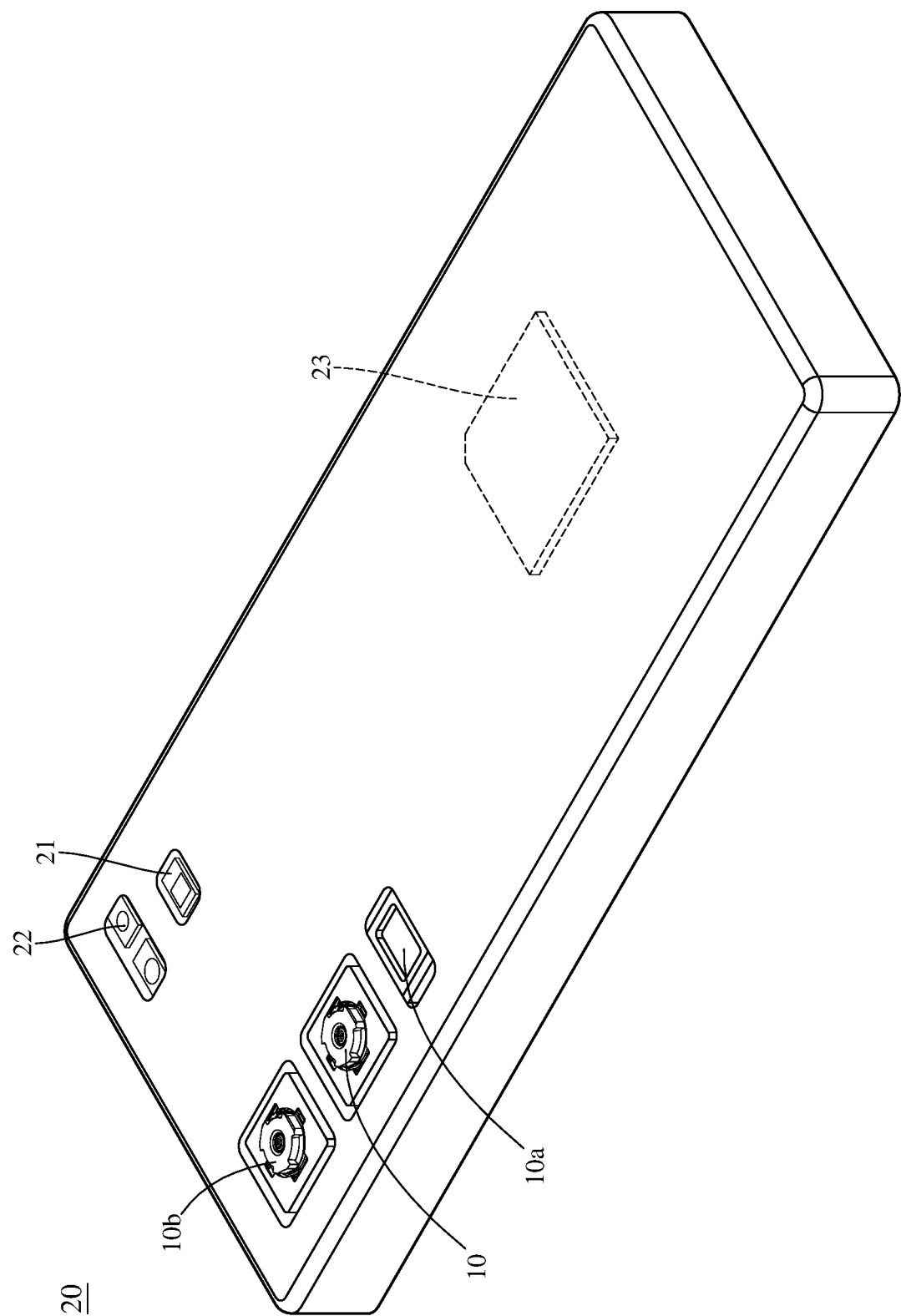
FIG. 22 is one perspective view of an electronic device according to the 12th embodiment of the present disclosure.
Figure 23:
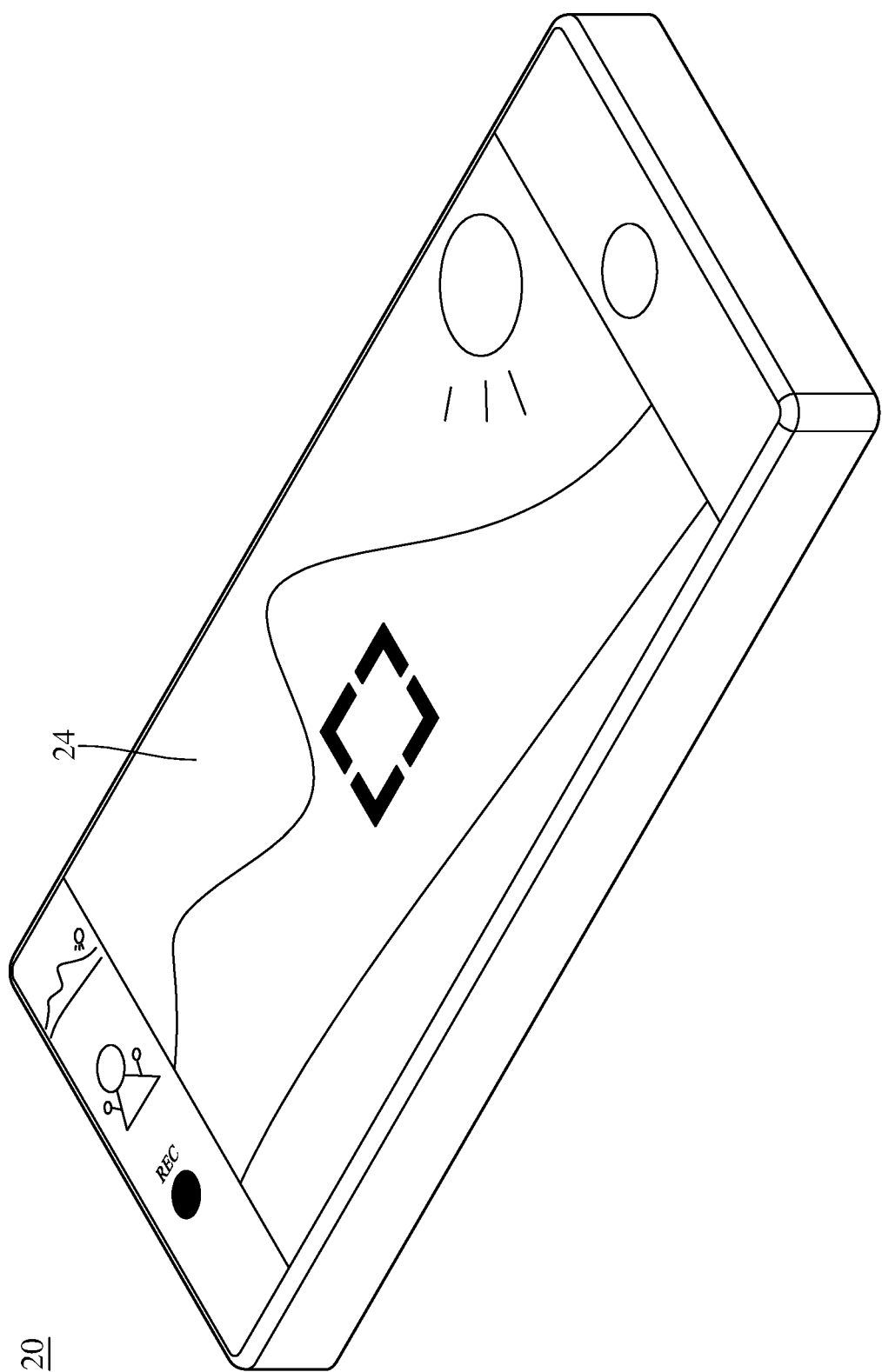
FIG. 23 is another perspective view of the electronic device in FIG. 22.
Figure 24:
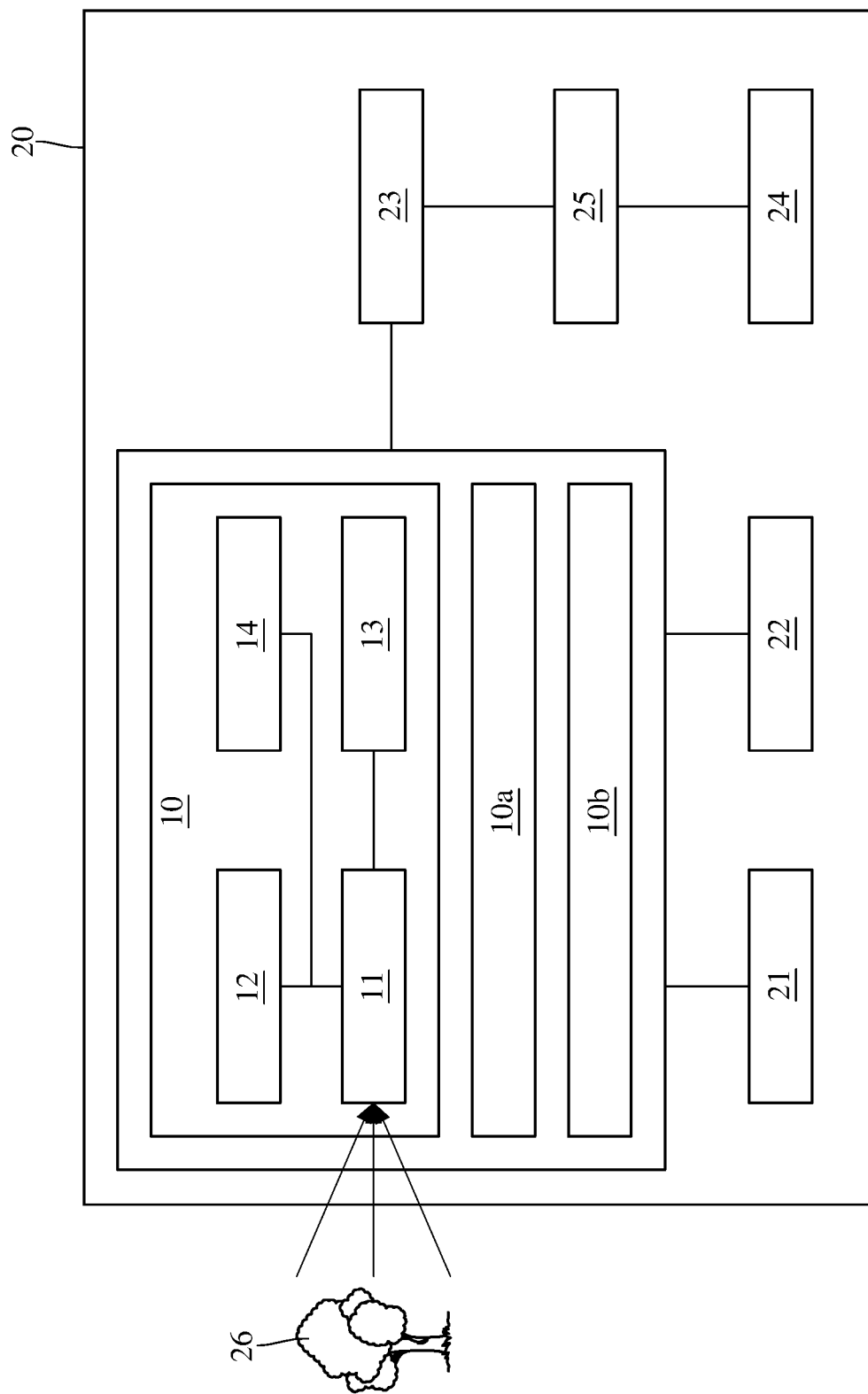
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22.

In this embodiment, an electronic device 20 is a smartphone including the image capturing unit 10 disclosed in the 11th embodiment, an image capturing unit 10a, an image capturing unit 10b, a flash module 21, a focus assist module 22, an image signal processor 23, a user interface 24 and an image software processor 25. The image capturing unit 10, the image capturing unit 10a and the image capturing unit 10b all face the same direction, and each of the image capturing units 10, 10a and 10b has a single focal point. Furthermore, the image capturing unit 10a and the image capturing unit 10b all have a configuration similar to that of the image capturing unit 10. In detail, each of the image capturing unit 10a and the image capturing unit 10b includes a lens unit, a driving device, an image sensor and an image stabilizer, and the lens unit includes a lens assembly, a barrel and a holder member for holding the lens assembly.

In this embodiment, the image capturing units 10, 10a and 10b have different fields of view (e.g., the image capturing unit 10 is a wide-angle image capturing unit, the image capturing unit 10a is a telephoto image capturing unit and the image capturing unit 10b is an ultra wide-angle image capturing unit), such that the electronic device 20 has various magnification ratios so as to meet the requirement of optical zoom functionality. In this embodiment, the electronic device 20 includes multiple image capturing units 10, 10a and 10b, but the present disclosure is not limited to the number and arrangement of image capturing units.

When a user captures images of an object 26, the light rays converge in the image capturing unit 10, the image capturing unit 10a or the image capturing unit 10b to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical imaging lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising five lens elements, the five lens elements being, in order from an object side to an image side, a first lens element, a second lens element, a third lens element, a fourth lens element and a fifth lens element; each of the five lens elements having an object-side surface facing toward the object side and an image-side surface facing toward the image side;
wherein the first lens element has positive refractive power, the object-side surface of the first lens element is convex in a paraxial region thereof, the second lens element has negative refractive power, the object-side surface of the fourth lens element is convex in a paraxial region thereof, the fifth lens element has negative refractive power, and the image-side surface of the fifth lens element is concave in a paraxial region thereof and has at least one convex critical point in an off-axis region thereof;

wherein an Abbe number of the second lens element is V2, an Abbe number of the third lens element is V3, an Abbe number of the fourth lens element is V4, a central thickness of the fourth lens element is CT4, a central thickness of the fifth lens element is CT5, a curvature radius of the object-side surface of the fourth lens element is R7, a focal length of the optical imaging lens assembly is f, a focal length of the first lens element is f1, a focal length of the second lens element is f2, and the following conditions are satisfied:

$30.0 < V2+V3+V4 < 95.0;$ $1.35 < CT5/CT4;$ $0.40 < R7/f < 2.80;$ and $2.60 < |f2/f1| < 5.00.$ 2. The optical imaging lens assembly of claim 1, wherein the central thickness of the fourth lens element is CT4, the central thickness of the fifth lens element is CT5, a vertical distance between the at least one convex critical point on the image-side surface of the fifth lens element and an optical axis is Yc52, a maximum effective radius of the image-side surface of the fifth lens element is Y52, and the following conditions are satisfied:

$1.50 < CT5/CT4 < 3.80;$ and $0.20 < Yc52/Y52 < 0.60.$

3. The optical imaging lens assembly of claim 1, wherein the image-side surface of the fourth lens element is concave in a paraxial region thereof, the curvature radius of the object-side surface of the fourth lens element is R7, the focal length of the optical imaging lens assembly is f, and the following condition is satisfied:

$0.80 < R7/f < 2.50.$

4. The optical imaging lens assembly of claim 1, wherein a focal length of the fourth lens element is f4, a focal length of the fifth lens element is f5, and the following condition is satisfied:

$2.0 < |f4/f5| < 7.0.$

5. The optical imaging lens assembly of claim 1, wherein a minimum value among Abbe numbers of all lens elements of the optical imaging lens assembly is Vmin, a maximum value among refractive indices of all lens elements of the optical imaging lens assembly is Nmax, and the following conditions are satisfied:

$10.0 < Vmin < 20.0;$ and $1.66 < Nmax < 1.75.$

6. The optical imaging lens assembly of claim 1, wherein the central thickness of the fourth lens element is CT4, an axial distance between the fourth lens element and the fifth lens element is T45, and the following condition is satisfied:

$0.80 < CT4/T45 < 1.5.$

7. The optical imaging lens assembly of claim 1, wherein an axial distance between the object-side surface of the first lens element and an image surface is TL, the focal length of the optical imaging lens assembly is f, a maximum image height of the optical imaging lens assembly is ImgH, and the following conditions are satisfied:

$3.0 \text{ [mm]} < TL < 6.0 \text{ [mm]};$ $0.90 < TL/f < 1.40;$ and $0.90 < TL/ImgH < 1.60.$ 8. The optical imaging lens assembly of claim 1, wherein the image-side surface of the first lens element is concave in a paraxial region thereof and has at least one critical point in an off-axis region thereof, a curvature radius of the object-side surface of the first lens element is R1, a curvature radius of the image-side surface of the first lens element is R2, a vertical distance between the at least one critical point on the image-side surface of the first lens element and an optical axis is Yc12, a maximum effective radius of the image-side surface of the first lens element is Y12, and the following conditions are satisfied:

$-2.0 < (R1+R2)/(R1-R2) < -1.4;$ and $0.60 < Yc12/Y12 < 1.0.$

9. An optical imaging lens assembly comprising five lens elements, the five lens elements being, in order from an object side to an image side, a first lens element, a second lens element, a third lens element, a fourth lens element and a fifth lens element; each of the five lens elements having an object-side surface facing toward the object side and an image-side surface facing toward the image side;

wherein the first lens element has positive refractive power, the object-side surface of the first lens element is convex in a paraxial region thereof, the second lens element has negative refractive power, the image-side surface of the second lens element is concave in a paraxial region thereof, the object-side surface of the fourth lens element is convex in a paraxial region thereof, the fifth lens element has negative refractive power, the object-side surface of the fifth lens element is convex in a paraxial region thereof, and the image-side surface of the fifth lens element is concave in a paraxial region thereof and has at least one convex critical point in an off-axis region thereof;

wherein an Abbe number of the second lens element is V2, an Abbe number of the third lens element is V3, an Abbe number of the fourth lens element is V4, a central thickness of the fourth lens element is CT4, a central thickness of the fifth lens element is CT5, a curvature radius of the object-side surface of the fourth lens element is R7, a focal length of the optical imaging lens assembly is f, a focal length of the first lens element is f1, a focal length of the second lens element is f2, and the following conditions are satisfied:

$30.0 < V2+V3+V4 < 95.0;$ $1.35 < CT5/CT4;$ $0 < R7/f < 2.80;$ and $2.50 < |f2/f1|.$ 10. The optical imaging lens assembly of claim 9, wherein the central thickness of the fourth lens element is CT4, the central thickness of the fifth lens element is CT5, the focal length of the first lens element is f1, the focal length of the second lens element is f2, and the following conditions are satisfied:

$1.50 < CT5/CT4 < 3.80;$ and $2.50 < |f2/f1| < 5.00.$

11. The optical imaging lens assembly of claim 9, wherein the object-side surface of the fourth lens element has at least one critical point in an off-axis region thereof, the curvature radius of the object-side surface of the fourth lens element is R7, the focal length of the optical imaging lens assembly is f, a vertical distance between the at least one critical point on the object-side surface of the fourth lens element and an optical axis is Yc41, a maximum effective radius of the object-side surface of the fourth lens element is Y41, and the following conditions are satisfied:

$0.80 < CT4/T45 < 1.5.$ $0.35 < Yc41/Y41 < 0.70.$

12. The optical imaging lens assembly of claim 9, wherein the Abbe number of the second lens element is V2, the Abbe number of the third lens element is V3, the Abbe number of the fourth lens element is V4, and the following conditions are satisfied:

$10.0 < V2 < 20.0;$ $15.0 < V3 < 38.0;$ and $15.0 < V4 < 38.0.$

13. The optical imaging lens assembly of claim 9, wherein the Abbe number of the second lens element is V2, a refractive index of the second lens element is N2, and the following condition is satisfied:

$7.0 < V2/N2 < 12.0.$

14. The optical imaging lens assembly of claim 9, wherein a central thickness of the first lens element is CT1, an axial distance between the first lens element and the second lens element is T12, and the following condition is satisfied:

$3.8 < CT1/T12 < 8.0.$

15. The optical imaging lens assembly of claim 9, wherein a curvature radius of the image-side surface of the second lens element is R4, the focal length of the optical imaging lens assembly is f, and the following condition is satisfied:

$1.0 < R4/f < 2.3.$

16. The optical imaging lens assembly of claim 9, wherein each of at least three lens elements of the optical imaging lens assembly has at least one lens surface having at least one inflection point, the focal length of the optical imaging lens assembly is f, a curvature radius of the object-side surface of the third lens element is R5, a curvature radius of the image-side surface of the third lens element is R6, and the following condition is satisfied:

$f/|R5| + f/|R6| < 1.5.$

17. The optical imaging lens assembly of claim 9, wherein the fourth lens element has positive refractive power, the focal length of the optical imaging lens assembly is f, a focal length of the third lens element is f3, a focal length of the fourth lens element is f4, a focal length of the fifth lens element is f5, and the following condition is satisfied:

$-0.50 < f/f3 + f/f4 + f/f5 < 0.$

18. The optical imaging lens assembly of claim 9, wherein the focal length of the optical imaging lens assembly is f, a focal length of the fifth lens element is f5, an f-number of the optical imaging lens assembly is Fno, half of a maximum field of view of the optical imaging lens assembly is HFOV, and the following conditions are satisfied:

$-2.0 < f5/f < -1.0;$ $1.40 < Fno < 2.60;$ and $35.0\ [\text{deg.}] < HFOV < 50.0\ [\text{deg.}].$ 19. An image capturing unit, comprising:
the optical imaging lens assembly of claim 9; and
an image sensor disposed on an image surface of the optical imaging lens assembly.

20. An electronic device, comprising:
the image capturing unit of claim 19.

* * * * *

UNITED STATES PATENT AND TRADEMARK OFFICE
CERTIFICATE OF CORRECTION

PATENT NO. : 11,092,785 B2
APPLICATION NO. : 16/503812
DATED : August 17, 2021
INVENTOR(S) : Yu-Chun Ke It is certified that error appears in the above-identified patent and that said Letters Patent is hereby corrected as shown below:

In the Claims

In Column 50, Claim 10, Line 63, the formula "$2.50 < |f2/f1| < 5.00$" is corrected to appear as follows: $2.60 < |f2/f1| < 5.00$ In Column 51, Claim 11, Line 7, the formula "$0.80 < CT4/T45 < 1.5$" is corrected to appear as follows: $0.80 < R7/f < 2.50$ Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*